(A)

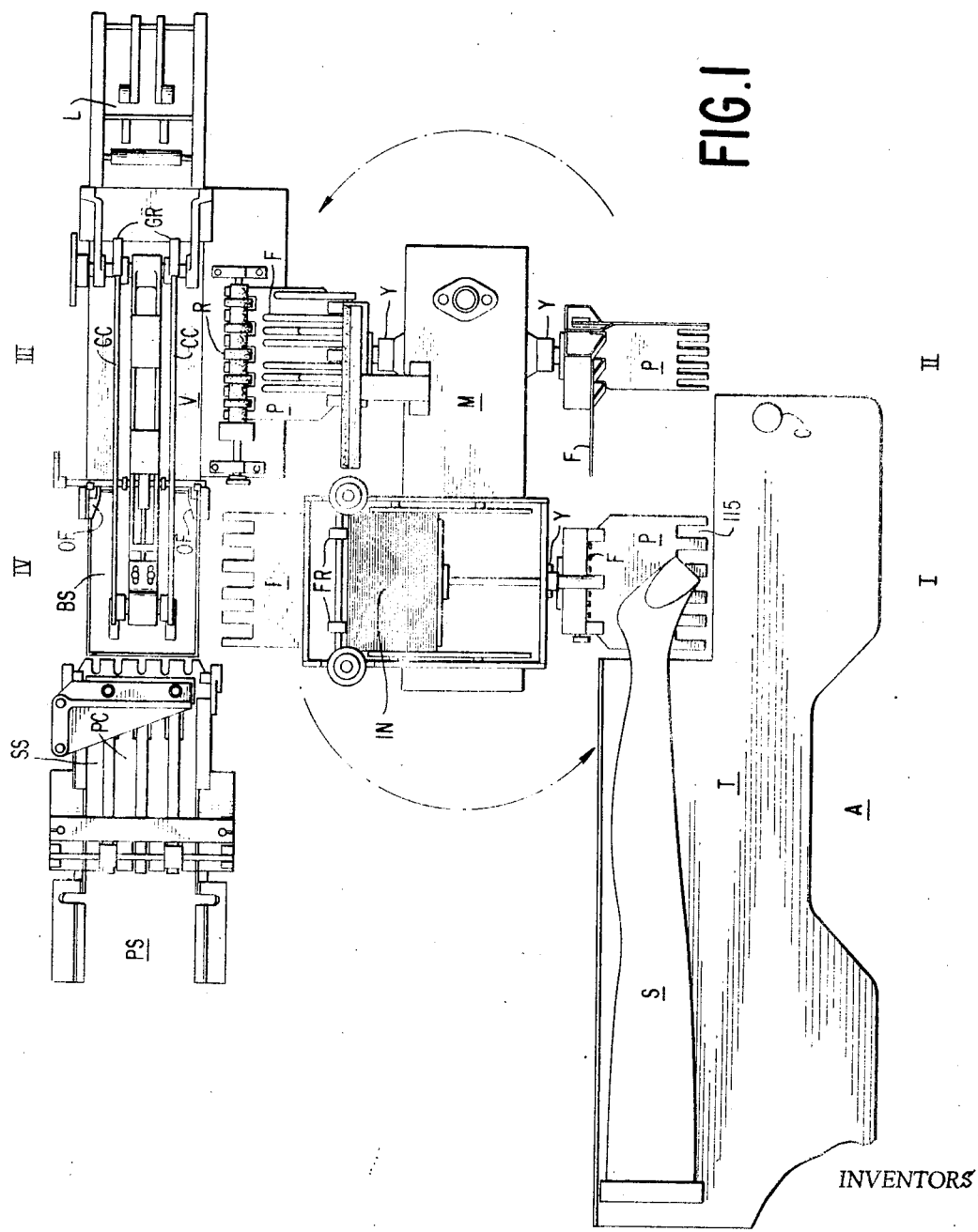

(B)

(C)

INVENTORS
JOHN W. GLAZE, JR.
JOSEPH P. WORTH
JAMES C. WILSON

BY Browne, Schuyler
& Beveridge

ATTORNEYS

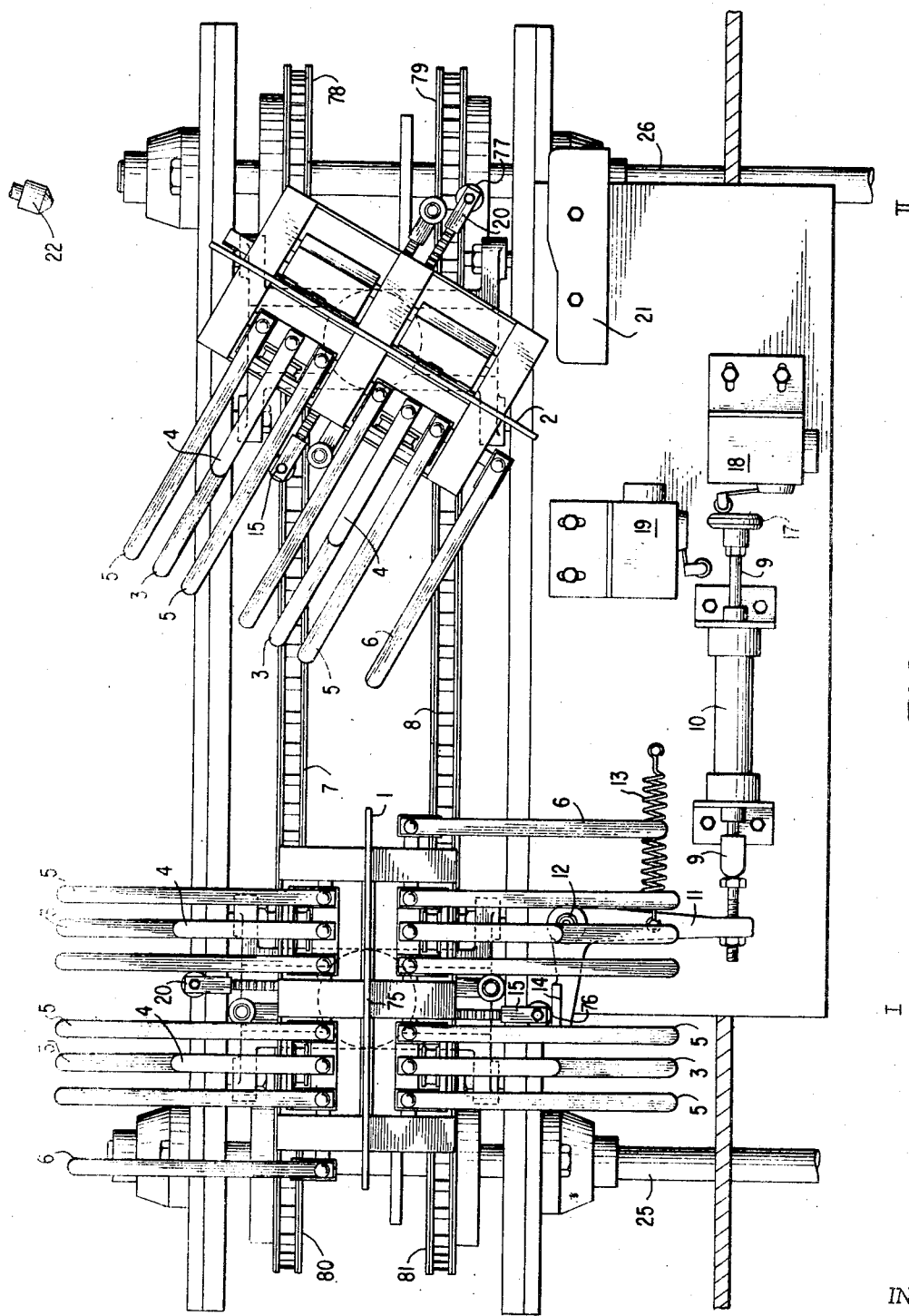

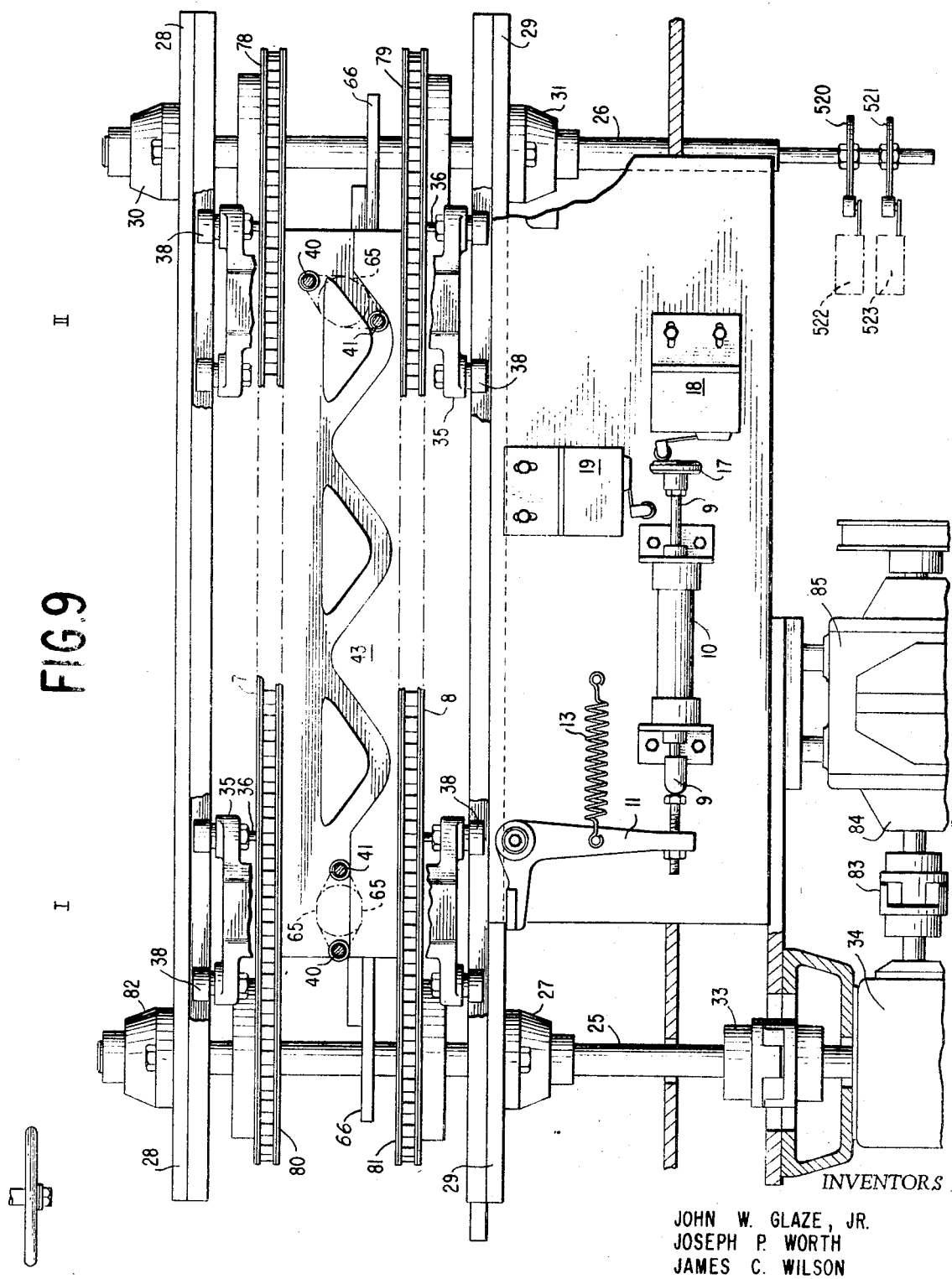

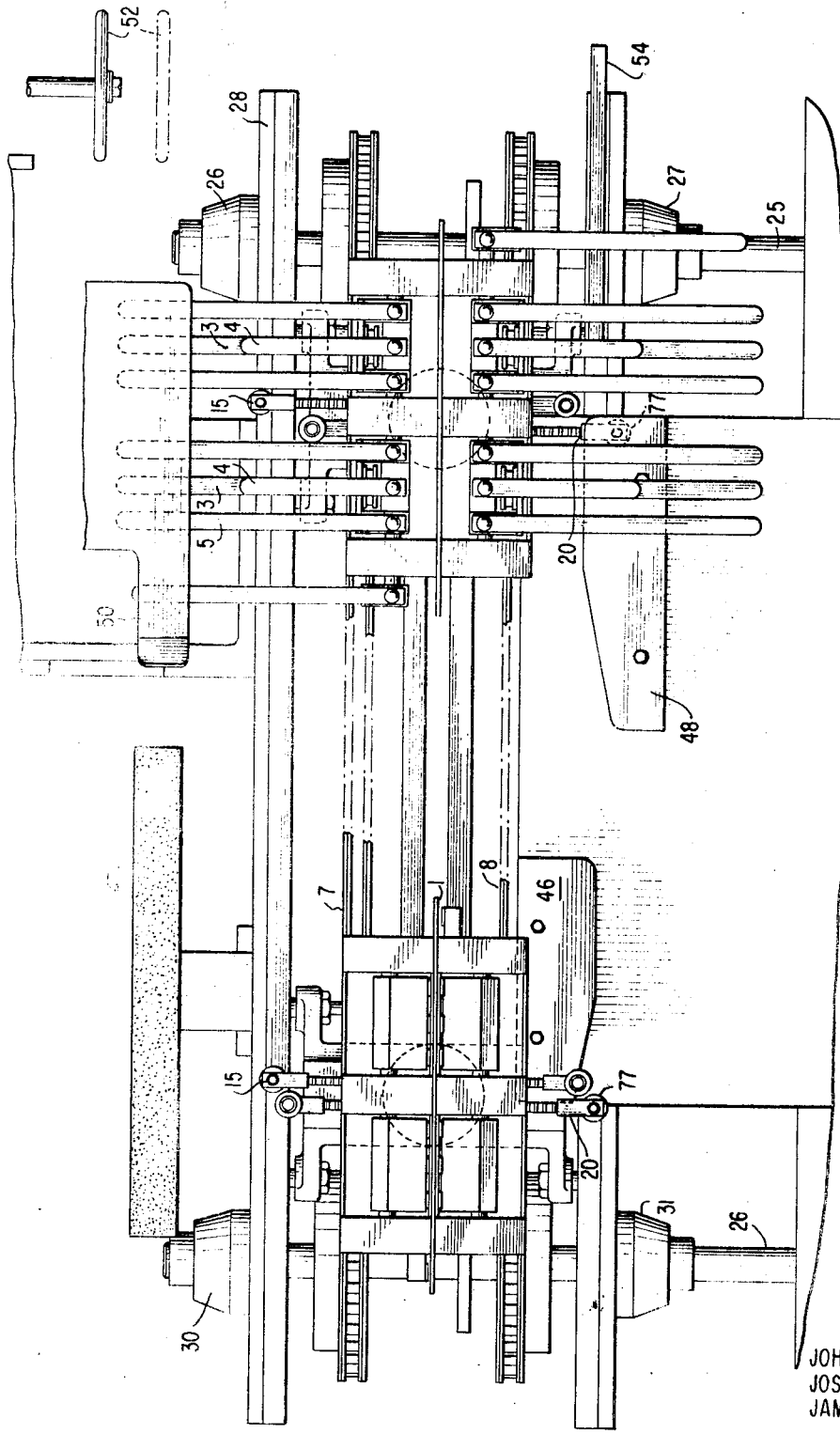

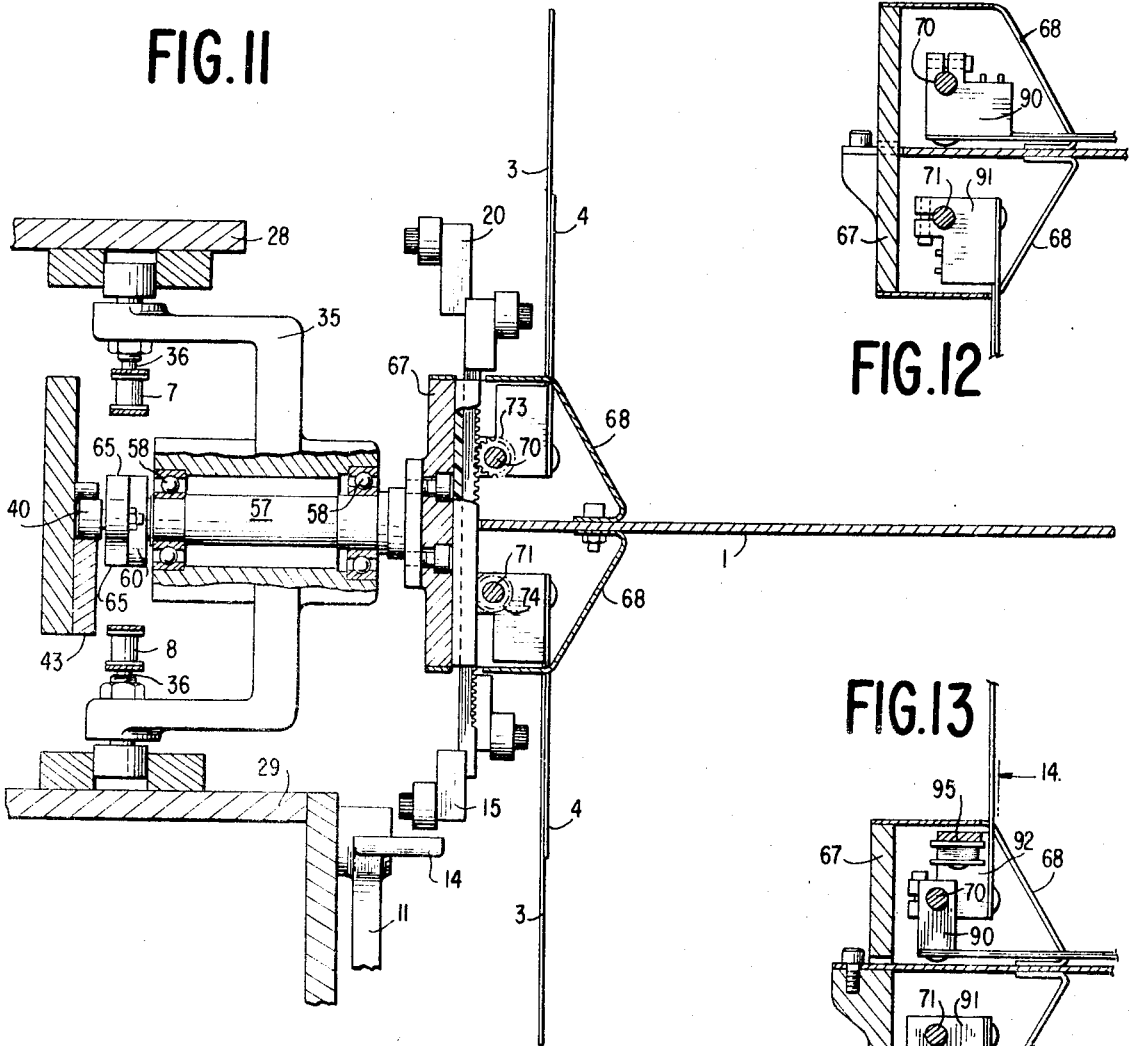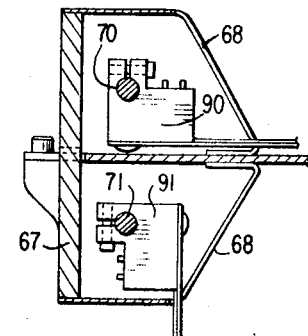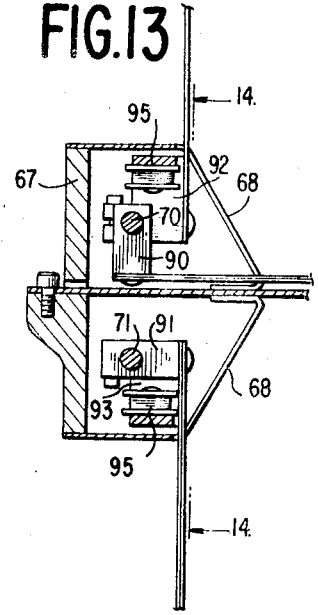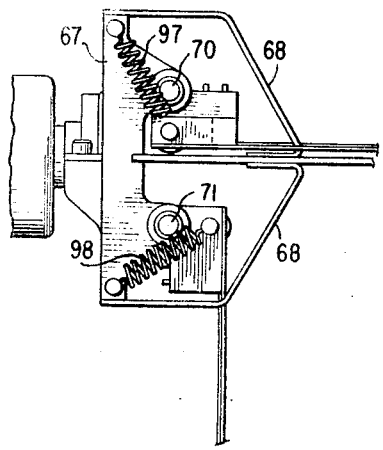

May 26, 1970   J. W. GLAZE, JR., ET AL   3,514,019
HOSIERY MACHINE
Filed Dec. 22, 1966   23 Sheets-Sheet 7

INVENTORS
JOHN W. GLAZE, JR.
JOSEPH P. WORTH
JAMES C. WILSON
BY
Browne, Schuyler & Beveridge
ATTORNEYS

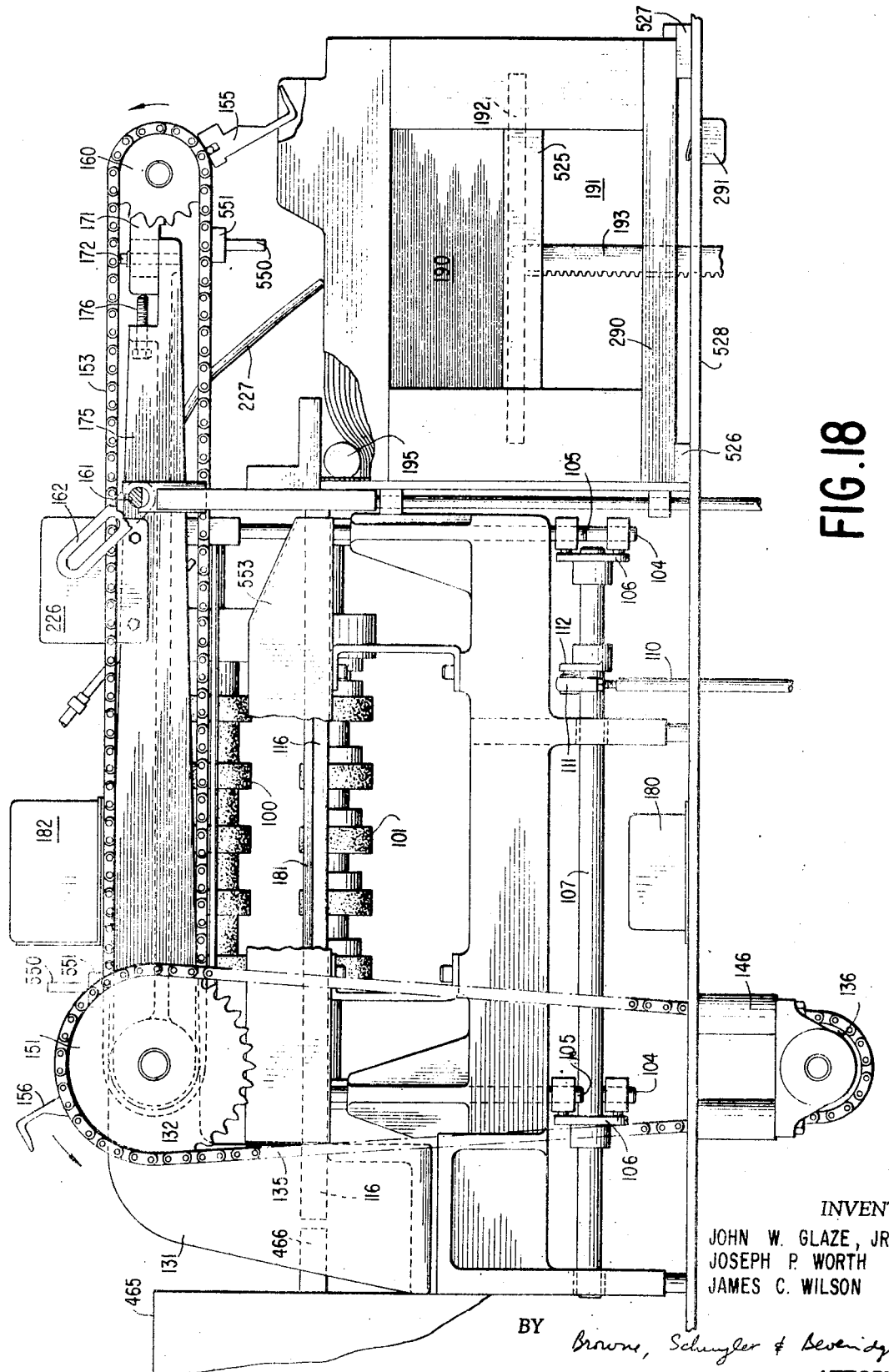

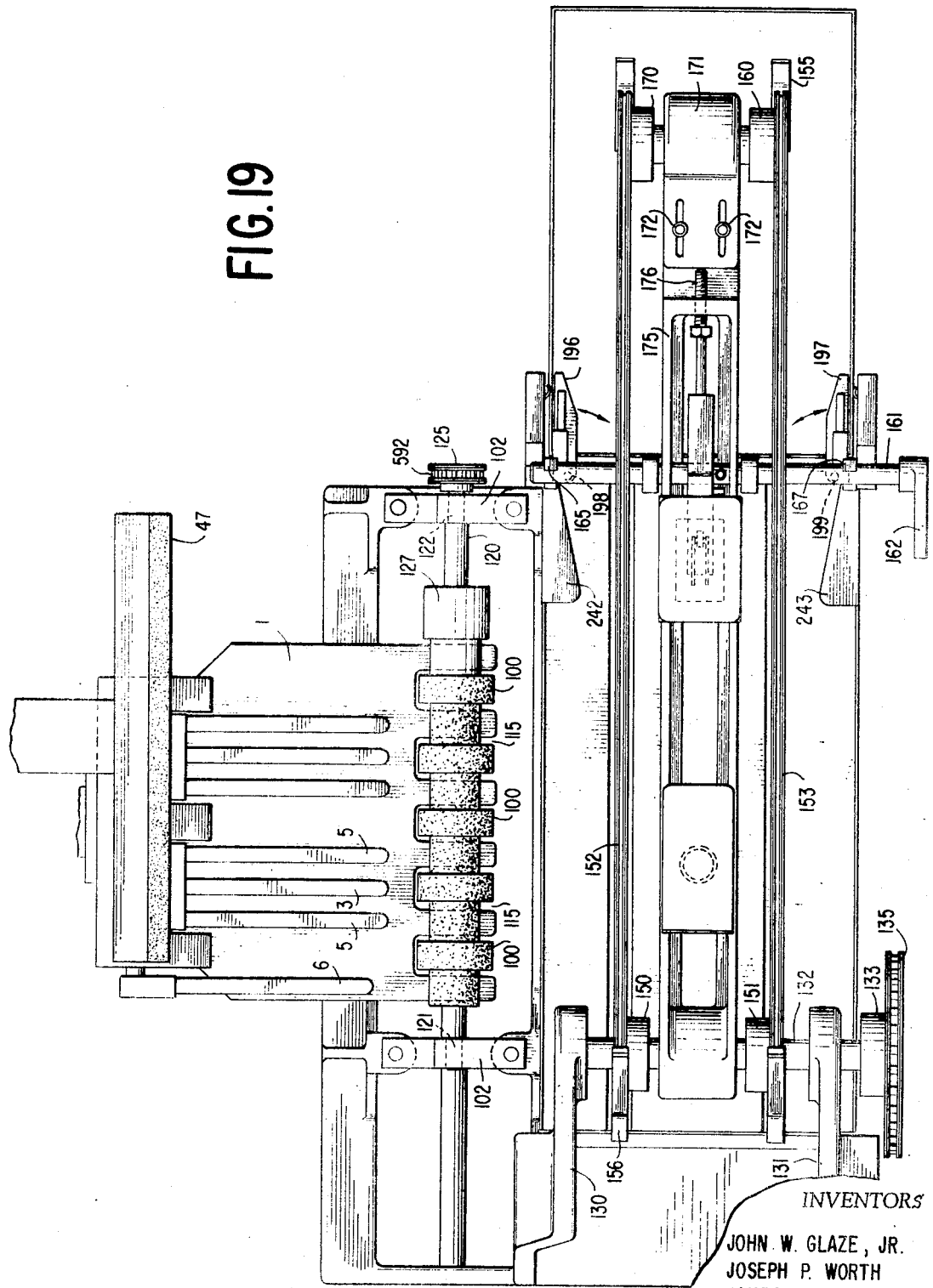

INVENTORS
JOHN W. GLAZE, JR.
JOSEPH P. WORTH
JAMES C. WILSON

BY Browne, Schuyler & Beveridge

ATTORNEYS

May 26, 1970    J. W. GLAZE, JR., ET AL    3,514,019
HOSIERY MACHINE

Filed Dec. 22, 1966      23 Sheets-Sheet 11

INVENTORS
JOHN W. GLAZE, JR.
JOSEPH P. WORTH
JAMES C. WILSON

BY Browne, Schuyler & Beveridge

ATTORNEYS

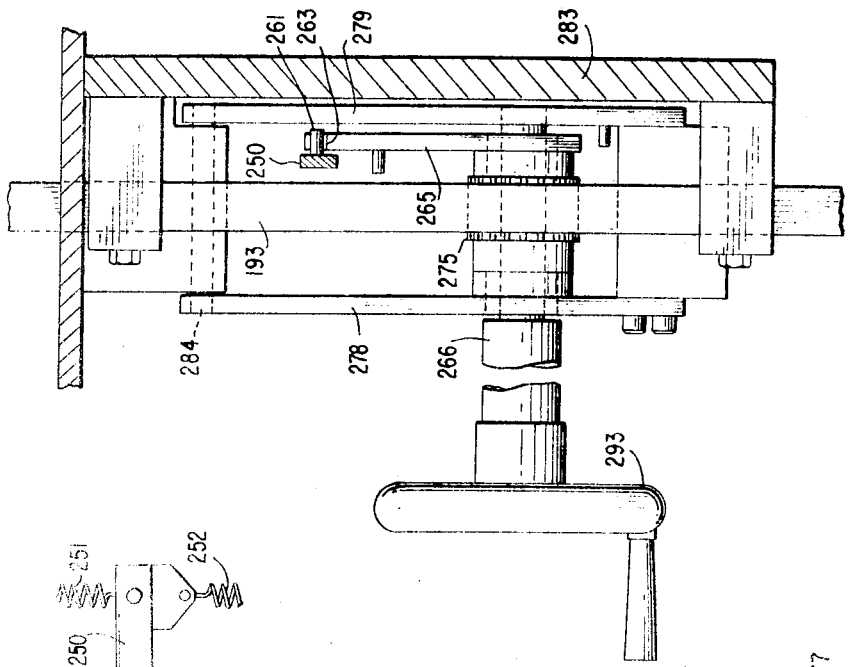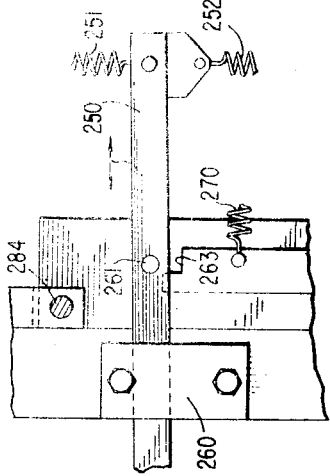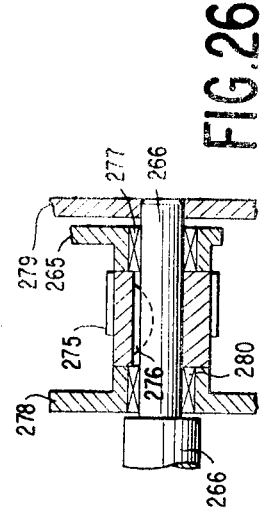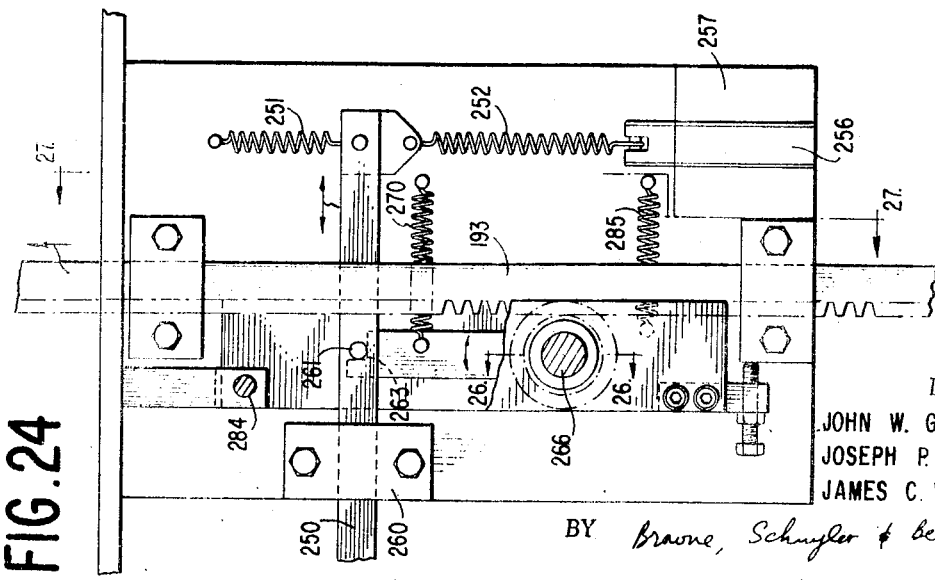

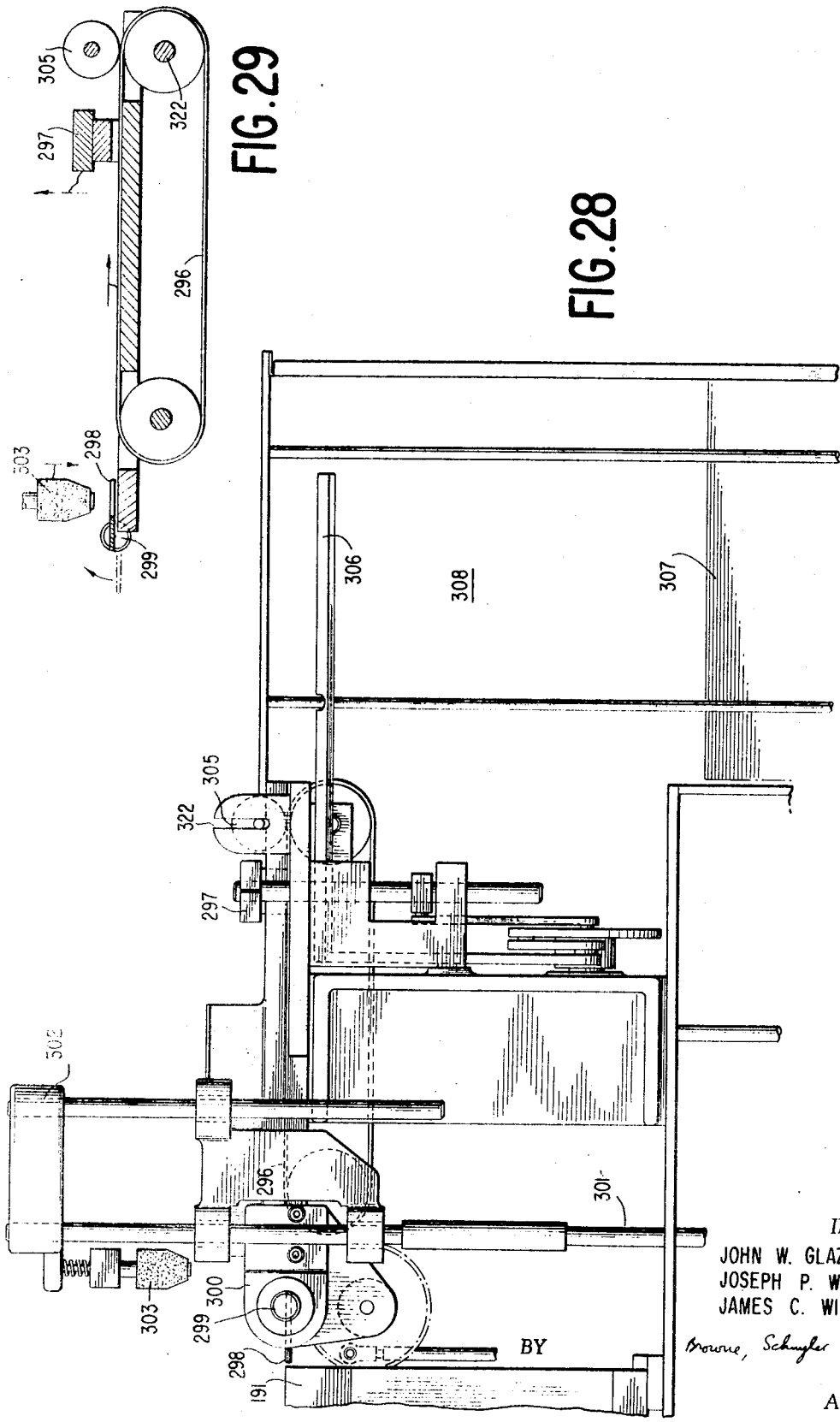

May 26, 1970     J. W. GLAZE, JR., ET AL     3,514,019
HOSIERY MACHINE

Filed Dec. 22, 1966     23 Sheets-Sheet 14

INVENTORS
JOHN W. GLAZE, JR.
JOSEPH P. WORTH
JAMES C. WILSON

Browne, Schuyler & Beveridge
ATTORNEYS

May 26, 1970  J. W. GLAZE, JR., ET AL  3,514,019
HOSIERY MACHINE

Filed Dec. 22, 1966  23 Sheets-Sheet 15

INVENTORS
JOHN W. GLAZE, JR.
JOSEPH P. WORTH
JAMES C. WILSON

BY Browne, Schuyler & Beveridge

ATTORNEYS

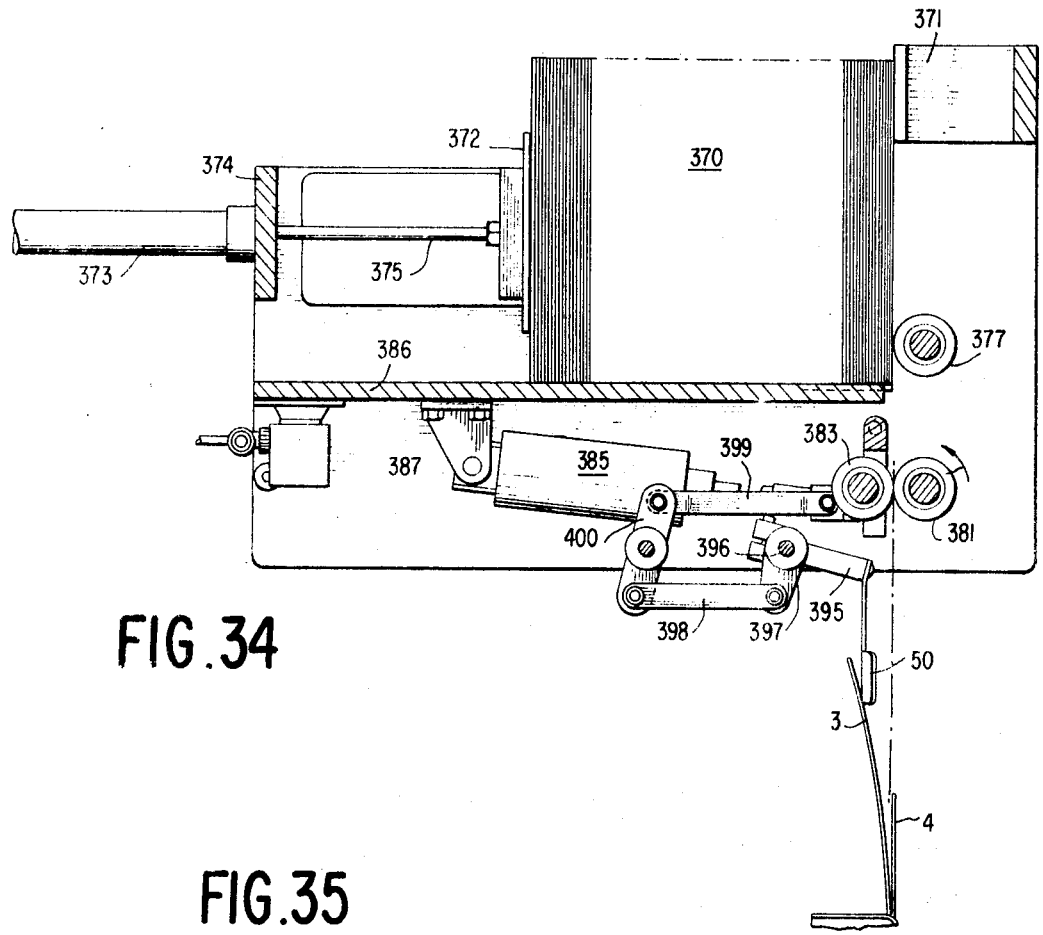
FIG. 34
FIG. 35
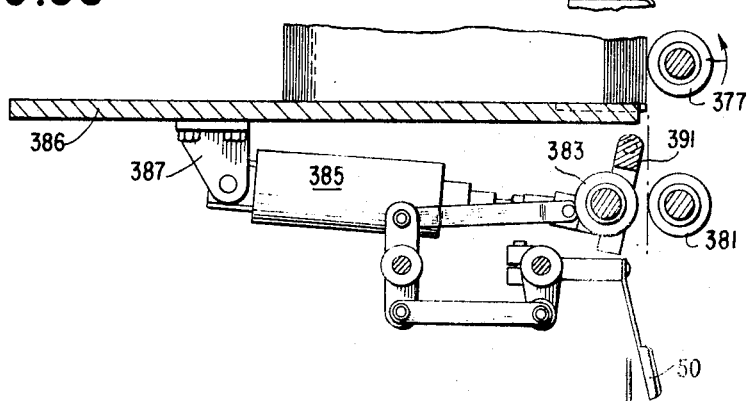
FIG. 36
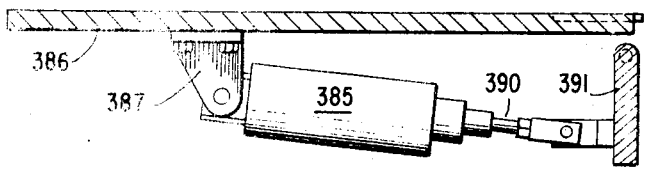
INVENTORS
JOHN W. GLAZE, JR.
JOSEPH P. WORTH
JAMES C. WILSON
BY Morse, Schuyler & Beveridge
ATTORNEYS May 26, 1970   J. W. GLAZE, JR., ET AL   3,514,019
HOSIERY MACHINE
Filed Dec. 22, 1966   23 Sheets-Sheet 18

INVENTORS
JOHN W. GLAZE
JOSEPH P. WORTH
JAMES C. WILSON

BY Browne, Schuyler & Beveridge
ATTORNEYS

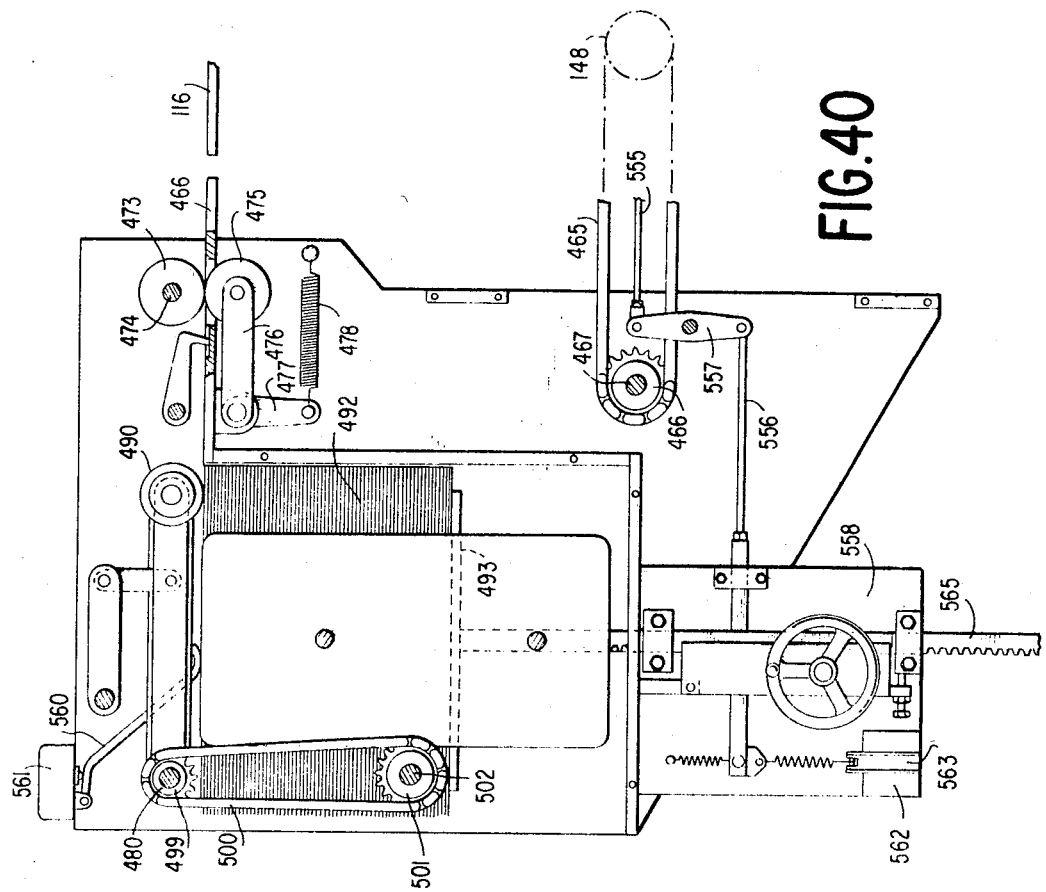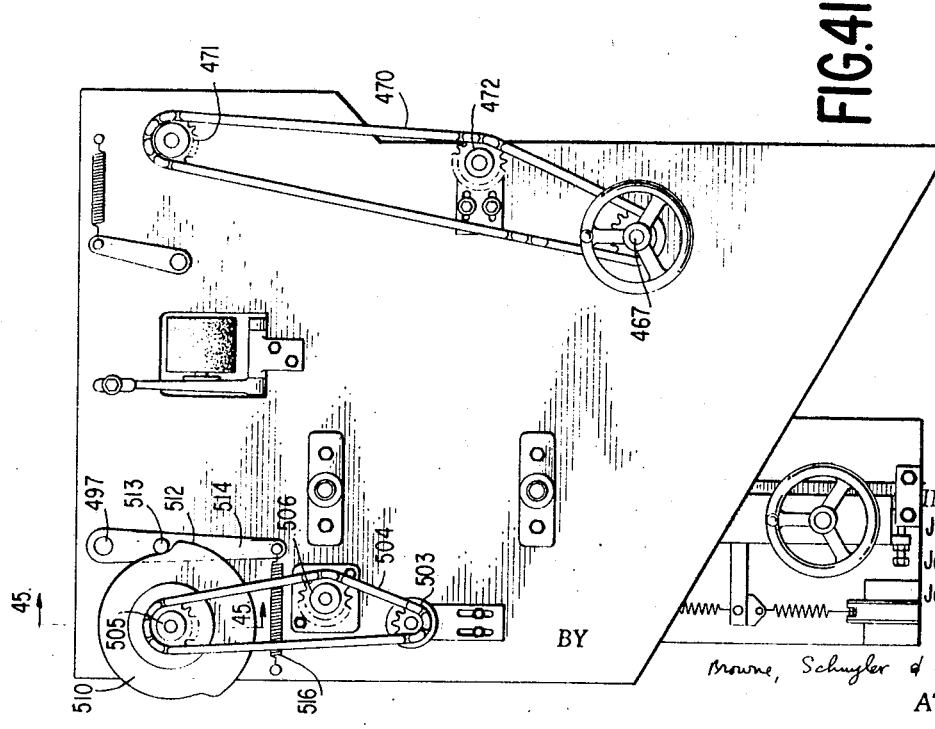

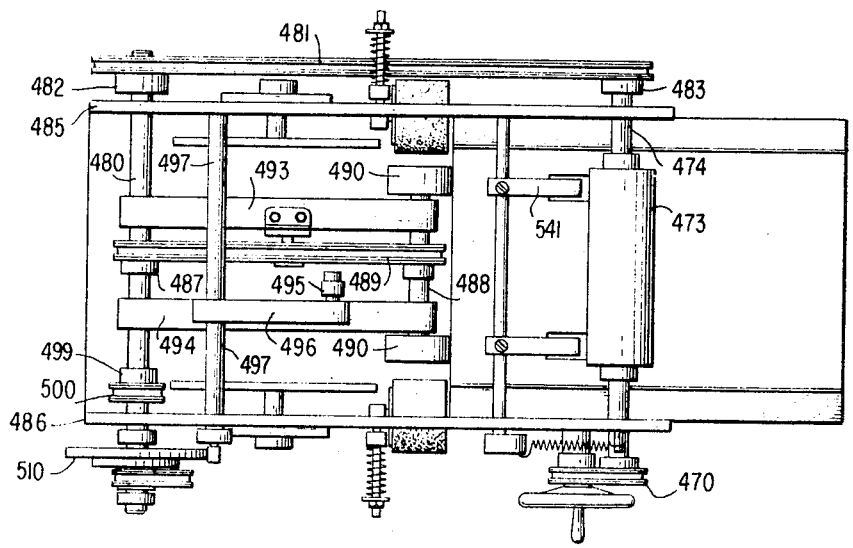
FIG.42
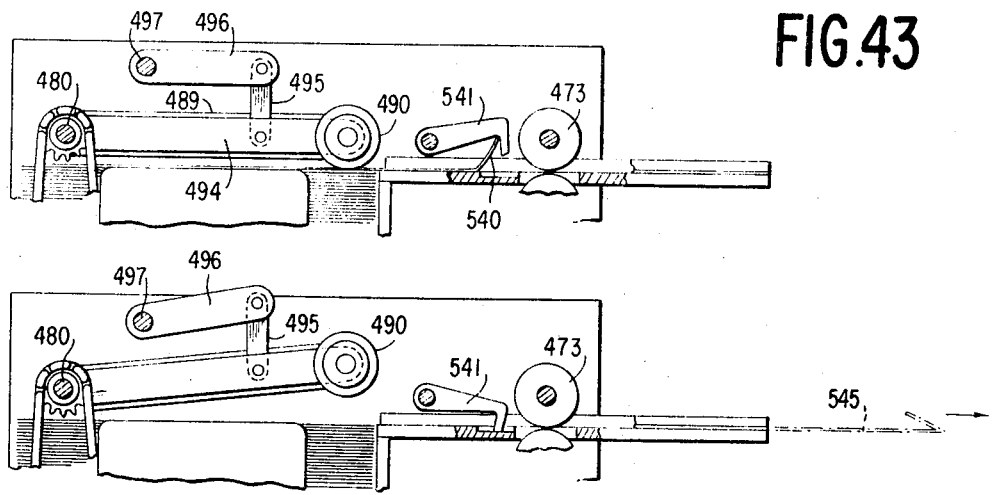
FIG.43
FIG.44
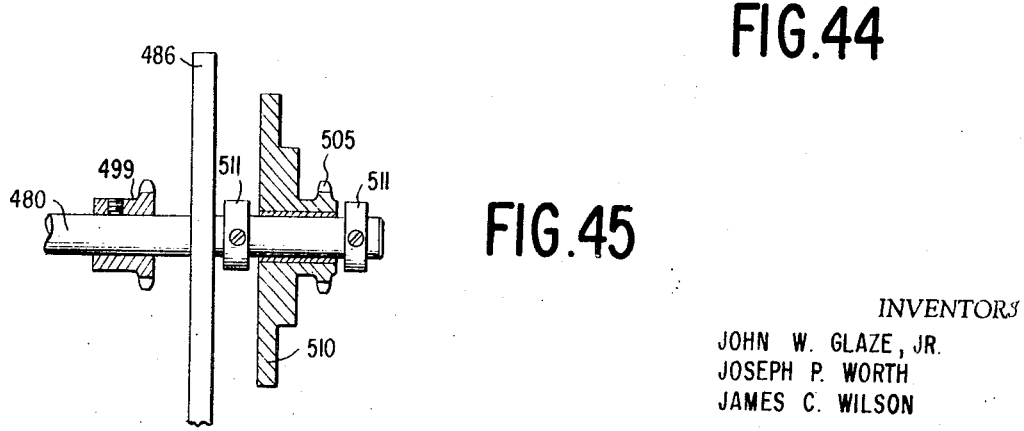
FIG.45

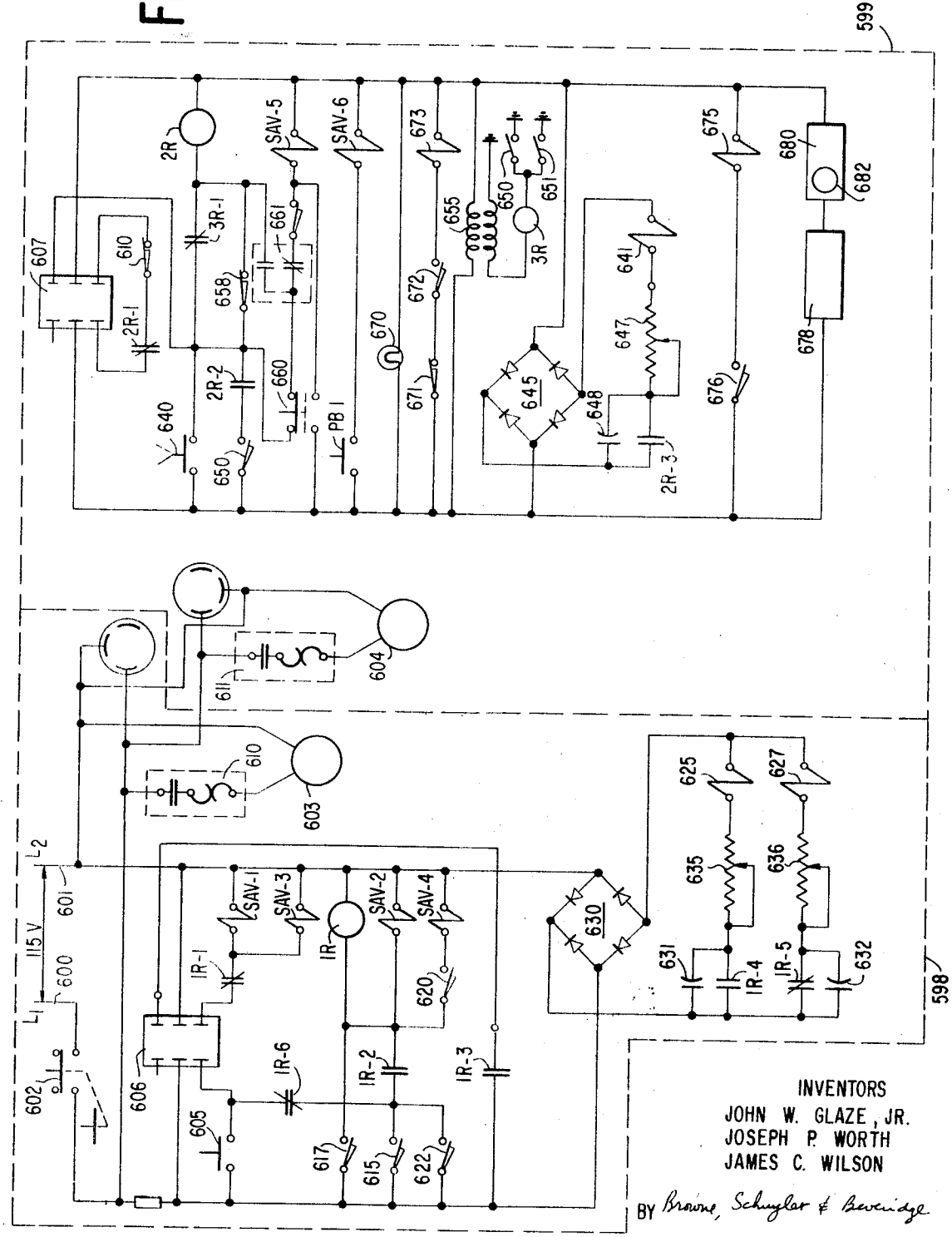

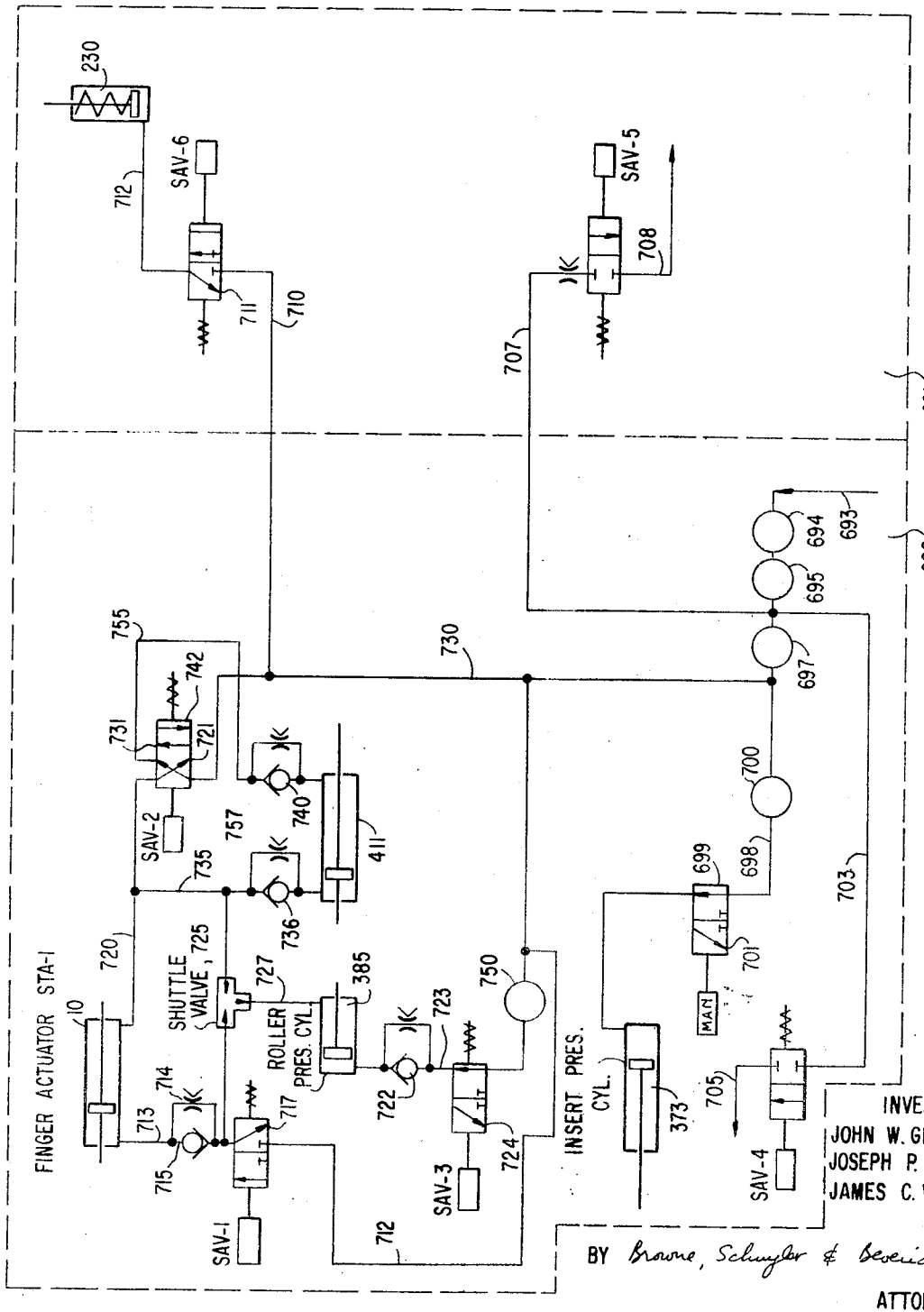

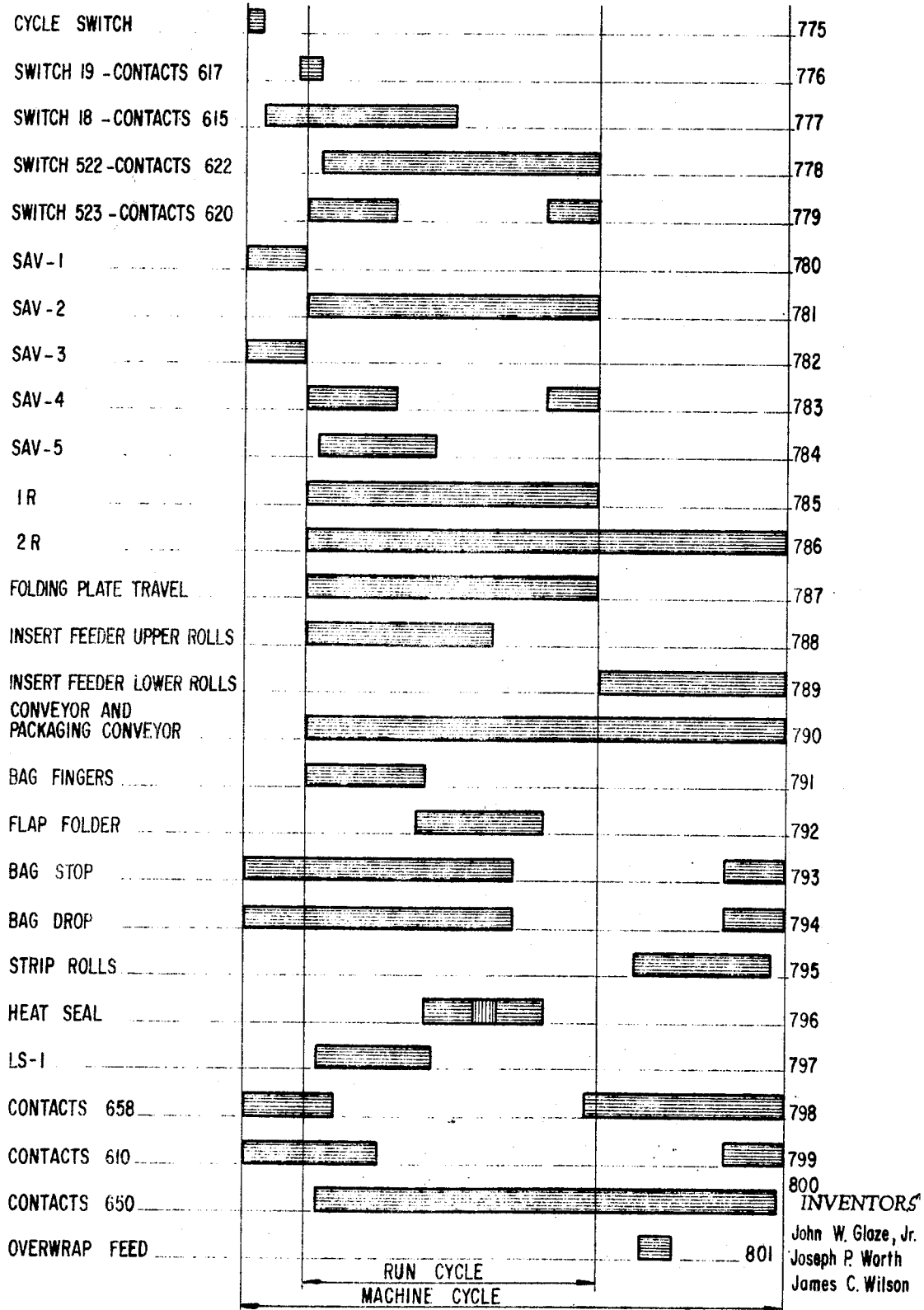

United States Patent Office 3,514,019
Patented May 26, 1970

3,514,019
HOSIERY MACHINE
John W. Glaze, Jr., Joseph P. Worth, and James C. Wilson, Charlotte, N.C., assignors to Autoboard Corporation, Charlotte, N.C., a corporation of North Carolina
Filed Dec. 22, 1966, Ser. No. 604,016
Int. Cl. A41h 43/00
U.S. Cl. 223—1
49 Claims

ABSTRACT OF THE DISCLOSURE

Hosiery is folded by placing it against a rotatable plate at an input station, rotating the plate and moving the axis of rotation of the plate away from the input station.

This invention relates to machinery for automatically folding and packaging women's hosiery.

In this country, hosiery is generally marketed in flat packages containing hose pairs folded around stiff peperboard inserts. The inserts provide rigidity to the package and keep the pliable hosiery from bunching at the bottom of the package when it is held vertically. The manner in which the hose is folded around its insert varies among the hosiery mills. By custom, however, nearly all mills in this country utilize folding techniques which leave the hose welt visible when the hose is placed in transparent packages. While most inserts are simply flat rectangular pieces of cardboard, some mills use specially shaped inserts to carry advertising matter.

Without exception, all mills in the United States fold and package hosiery by hand. Since hosiery is a low cost product sold in high volume, such hand operations represent an appreciable portion of the final price. However, people must be highly trained before they gain the efficiency necessary to fold and package hosiery at an economical rate.

Prior attempts have been made in the United States to develop machinery for automatically folding and packaging hosiery. One such machine is shown in U.S. Pat. No. 2,954,906 to Lamade et al. This machine folds hosiery by the use of platforms and levers. Unfortunately, this folding scheme has proven impractical. At any desirable speed, the platforms and levers tend to throw the hose out of position.

U.S. Pat. No. 3,237,363 to Spohr discloses a simple machine for folding and packaging a single hose. While the Spohr machine overcomes the disadvantages of the lever and platform type machine in folding, it obviously would have to be operated at a low folding rate. Moreover, only one type fold could be accomplished on only a single hose and the placement of any cardboard insert would have to be done by hand.

A few European companies have been successful in designing machinery for folding hosiery in the European style. Contrary to the custom in the United States, European mills sell hosiery with the welt folded and hidden under the fold. Since European machines are incapable of producing a fold acceptable to the buying public in this country, the machine have not been used here commercially.

This invention automatically folds, places the cardboard insert and packages hosiery. Its operator need only position the hosiery at the input station and initiate the entire operation by actuating a switch. By using this invention, a single operator is able to increase the rate of folding and packaging by as much as five-fold over the fastest hand rate. Moreover, an operator need not be nearly as skilled or experienced as an efficient hand folder.

Contrary to the European machines, this invention will fold and package single or multiple pairs of hosiery. The operator simply places the number of hose to be included in a single package at the input station and proceeds as usual.

In this invention, the cardboard inserts may be placed at virtually any position in the fold in accordance with the folding techniques of the various mills. Moreover, special L-shaped paper or cardboard overwraps may be included in the package. And, most importantly, due to the flexibility of insert placement, and the inherent flexibility of the folding scheme employed in this invention, virtually any type fold may be produced.

It is a primary object of this invention to automatically fold and package women's hosiery.

It is another primary further object of this invention to produce any one of the many folds used by the various hosiery mills.

It is another object of this invention to place different types of overwraps around the folded hosiery.

It is still another object of this invention to place inserts at virtually any position in the folded package.

It is a still further object of this invention to automatically place the folded hosiery with insert or alternately with insert and overwrap into a bag which is then sealed.

It is a further object of this invention to provide for the stacking of the packaged hosiery in a form which is readily adaptable for shipment.

Other objects and advantages of this invention will become obvious by reference to the following description in the accompanying drawings wherein:

FIG. 1 is a vertical view of this invention;

FIG. 8 is a view of folding plates at Stations I and II of the folding machine;

FIG. 9 illustrates the drive assembly for the folding plates and the turning cam arrangement between Stations I and II;

FIG. 10 is a view of the folding plates at Stations III and IV of the folding machine;

FIG. 11 is a cross-sectional view of the details of the folding plate mounting;

FIG. 12 is a cross-section of the folding plate assembly illustrating mounting of folding and insert fingers;

FIG. 13 shows the holdup assembly for the insert fingers in the folding plate assembly;

FIG. 14 is a cross-sectional view of the folding plate assembly taken along the line 14—14 of FIG. 13;

FIG. 15 is a cross-sectional view of the folding plate assembly illustrating the spring biased mounting of the folding fingers;

FIG. 18 is a side view of the conveyer and bagging section of this invention;

FIG. 19 is a vertical view of the stripper and conveyer assemblies of this invention;

FIG. 24 is a detail view of the bag lift rack assembly;

FIG. 25 is a view of the bag lift actuating link raised out of engagement;

FIG. 26 is a view of the clutch arrangement of the bag lifting rack taken along the line 26—26 of FIG. 24;

FIG. 27 is a side view of the bag lift assemblies taken along the line 27—27 of FIG. 24;

FIG. 28 is a side view of sealing station and package receiving hopper;

FIG. 29 illustrates the movable relationship between the various major elements of the sealing station;

FIG. 34 is a cross-sectional side view of the standard insert feeder;

FIG. 35 is a detailed view of the cylinder actuation linkages for the standard board feeder;

FIG. 36 is a side view of the mounting of the air cylinder of FIG. 35;

FIG. 40 is a cross-sectional view of the input linkages to the overwrap feeder;

FIG. 41 is a side view of the exterior linkages of the overwrap feeder;

FIG. 42 is a vertical view of the overwrap feeder;

FIG. 43 illustrates the feed roller of the overwrap feeder in a lowered (feeding) position;

FIG. 44 illustrates the feeder roller of the overwrap feeder in a raised position;

FIG. 45 illustrates the mounting of the feed roller raising cam;

FIG. 46 is a schematic diagram of the electrical power and control circuit of this invention;

FIG. 47 is a schematic diagram of the pneumatic circuit of this invention; and

FIG. 48 is a timing chart of this invention illustrating the time relationship of the various switches and cams.

GENERAL DESCRIPTION OF MACHINE OPERATION

A general understanding of the basic operation of this invention may be had by examining FIG. 1 of the drawings, which views the invention from above. An operator stands at point A, and positions hosiery S on work table T with the welt and abutting guide G and the foot against the upper surface of folding plate P at Station I. The guide is movable along the table and is positioned depending upon the length (size) of the hosiery being folded.

Figure 2:
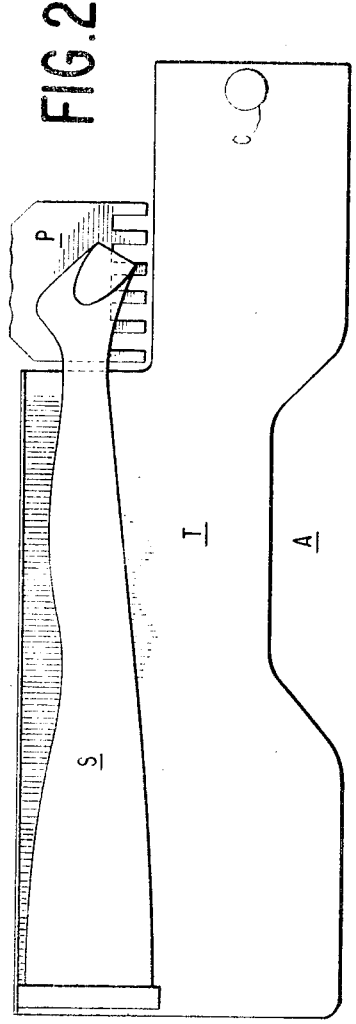

As will be explained in detail in connection with FIG. 2, a variety of folds may be accomplished by positioning and folding the foot portion of hosiery S in different ways when placed against the folding plate at Station I. The fold illustrated in FIG. 1 will be discussed in connection with FIG. 2 as Fold Type A.

Each folding plate P is rotatively supported at its innermost side in arbor yoke Y. Further, the folding plates are connected by a pair of drive chains (not shown), so that the plates may be made to follow a generally circular path counterclockwise about machine frame M. In operation, the folding plates travel to the next adjacent station during each machine cycle. Thus, during a single cycle, the folding plate pictured at Station I would travel to Station II.

After the operator has positioned hosiery as shown, she initiates a machine cycle by tripping cycle switch C. Folding fingers F then pivot downwardly against the upper surface of folding plate P at Station I, holding the foot portion of the hose against the upper surface of the plate. In those fold types for which it is desired that an insert be placed above the hose foot at this point, insert fingers similar to the folding fingers place a cardboard insert against the hose.

It is noted at this point that most types of folds include a flat one piece insert. This insert is placed in the fold in the manner just described. However, some folds require, in addition, a type of overwrap termed an L-board. The feeding of overwraps will be discussed in this general description in connection with Station III of the folding machine.

Following actuation of the cycle switch, control circuitry operates a clutch which causes each folding plate to move to the next adjacent Station. The folding plate initially at Station I moves to Station II. Turning cams behind arbor yoke Y cause the folding plate to rotate approximately 480 degrees, winding hose S about the plate as the hose is pulled from work table T.

At Station II, the folding plate stops with hose S completely wound around it with the hose welt trailing downward against the upper surface of the plate. As the folding plate comes to rest at Station II, a jet of air is directed downward at the welt end of the hose to tighten the fold. The folding plate stops at Station II 60 degrees from the horizontal so that the weight of the hose welt will hold the hose in position. The hose would now be convolutely folded around both the folding plate and the insert.

When the operator next trips cycle switch C, a second set of folding fingers F closes against the hose on the side of the folding plate opposite the first set of fingers. At the beginning of the cycle, just as the fingers begin to close, a second jet of air is directed downward at the welt end of the hose to again tighten the fold. At the same time, the folding plate holding the hose begins to travel around the end of the machine from Station II to Station III. While traversing this path, the folding plate is turned the remaining 60 degrees so it arrives at Station III in a horizontal position.

After stopping at Station III, upper and lower (not shown) stripping rollers R close on the folded hose. Rotation of rollers R pull the folded hose and insert from folding plate P onto conveyor tray V. The machine cycle ends at this point.

In those folds which include an overlap, a slightly different sequence takes place at Station III. *Rollers R strip the folded hosiery and insert from the folding plate at Station III.* Immediately before, overwrap feeder L feeds an overwrap onto conveyer tray V. Hosiery stripped at Station III slides onto the overwrap rather than the conveyor tray. Packaging is carried out thereafter in the standard manner.

When the cycle switch is next actuated, beginning the third machine cycle, conveyer chains CC, carrying grippers GR, push the folded hose, insert and overwrap, if any, to the left into bagging section BS. The bagging section contains a stack of bags with their mouths toward the right in FIG. 1. As grippers GR push the folded hose and insert toward the bagging section, bag opening fingers OF rotate about a vertical axis to the positions shown in FIG. 1 and, together with an air jet (not shown), open the mouth of the uppermost bag. The folded hosiery, insert and overwrap, if any, are moved by the grippers through the opened mouth completely into the bag. When the insert and hose strike the end of the bag, the entire package is moved to sealing section SS. Here the packaged hosiery stops until the beginning of the fourth machine cycle.

Shortly after the beginning of the next cycle, the bag flap is closed and heat sealed by a cam operated heating element. Package conveyer PC then moves the package from the sealing station to packing stack PS from which it may be removed for shipment.

As the bagging operation described above is occurring, folding plate P moves from Station III to Station IV in the third machine cycle, remaining in a horizontal position. Movement to Station IV causes folding fingers F on each side of folding plate P to be raised perpendicularly to the plate. Folding plate P stops in this position at Station IV.

At Station IV, the standard cardboard inserts are fed into the insert fingers on folding plate P. Inserts IN are stacked vertically at Station IV and fed downward by feed rollers FR. At the end of the third machine cycle, the insert is dropped into a V formed by the raised folding and insert fingers.

When the cycle switch is next tripped, beginning the fourth machine cycle, the folding plate travels to Station I to again receive hosiery for folding.

It is pointed out that while this brief description of machine operation discusses the folding and packaging of a single pair of hosiery, identical operations are normally being carried out during every machine cycle. That is, during each machine cycle, hosiery is being folded, stripped, bagged and sealed. Prior to beginning each machine cycle, the operator places hosiery on the folding plate at Station I.

DETAILED DESCRIPTION OF MACHINE OPERATION

(1) Initial folding of hose foot

This invention is capable of producing virtually all of the folds used by the various mills in this country. The three most common folds are illustrated in FIGS. 2 through 7 of the drawings.

Figure 3:
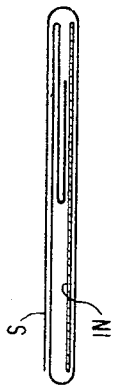
FIGS. 2 through 7 illustrate the technique for obtaining a variety of folds which may be accomplished by this invention.

FIG. 3 (Fold Type A) illustrates a fold in which both the foot and welt portions are on the same side of the insert and visible to the buyer. To form this fold, the operator places the foot portion of the hose on the folding plate and folds the hose toe back towards the heel as shown in FIG. 2. Tripping of cycle switch C causes insert fingers to be lowered against the hose so that the hose foot is between the folding plate and the insert. Subsequently turning of the folding plate produces the fold shown in FIG. 3.

Figure 5:
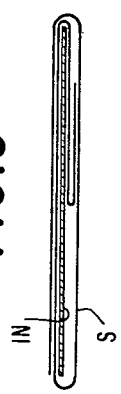
Figure 4:
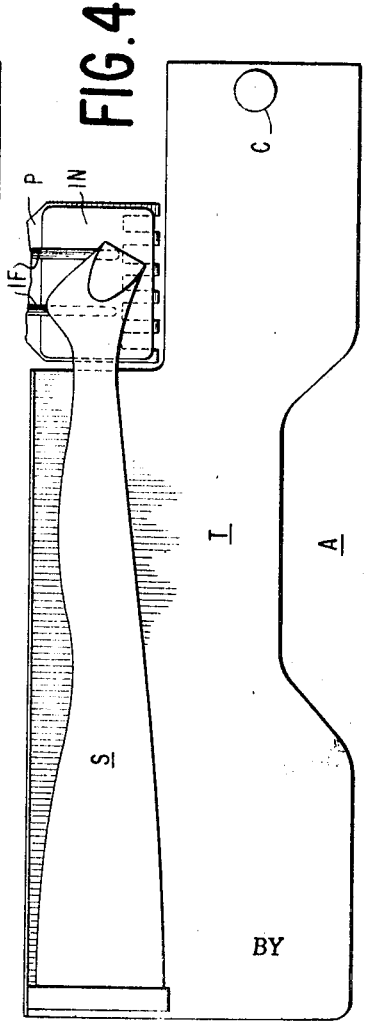

FIG. 5 (Fold Type B) illustrates a fold in which the foot and welt portions are on opposite sides of the insert. To form this fold, insert fingers IF holding insert IN are initially lowered against the upper surface of folding plate P (FIG. 4). Hose S is placed by the operator on top of the insert in the same manner it was placed against the top surface of the folding plate in FIG. 2. Tripping cycle switch C causes folding fingers to be lowered against the foot portion, holding the foot in the position shown while the folding plate is rotated, producing the fold shown in FIG. 5.

Figure 7:
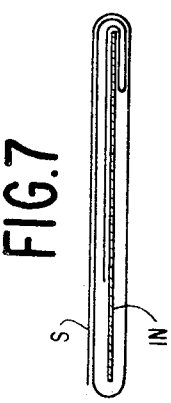
Figure 6:
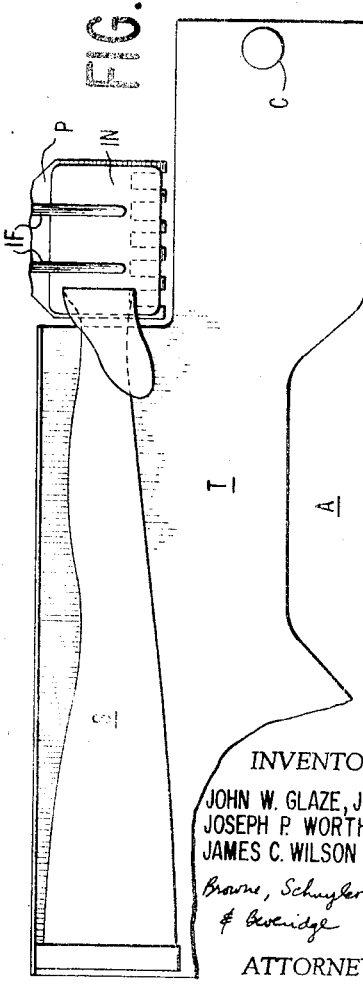

FIG. 7 (Fold Type C) illustrates a fold in which the entire foot portion is along one side of the insert and in which the welt may be visible to the buyer. Insert fingers IF holding insert IN are initially lowered as in fold type B. The operator, however, folds nearly the entire foot portion of the hose against the ankle as shown in FIG. 6. Tripping of cycle switch C causes the foot portion of the hose to be gripped against the ankle as shown in FIG. 6. Tripping of cycle switch C causes the foot portion of the hose to be gripped against the insert while the folding plate is turned, producing the fold in FIG. 7.

(2) Folding machine

To simplify the detailed explanation of this invention, the operation of the machine will be described during four successive machine cycles.

A machine cycle is defined as a sequence of operations, beginning with manual actuation of the cycle switch and ending when the last operation ends. Reference will also be made in this specification to run cycles. A run cycle is defined as a period of time, beginning when the folding plates first begin the move during a machine cycle and ending when the folding plates come to rest. As will become apparent, the folding plates do not begin their travel to the next adjacent Station when the cycle switch is first actuated. There is a short interval during which other operations are carried out. And, after the folding plates come to rest, certain other operations are carried out. Accordingly, a run cycle occurs in less time than does a machine cycle.

In explaining the operation of the folding machine, reference will be made to a single folding plate assembly as it travels from Station to Station. It is pointed out, however, that some operations are occurring at some Stations during every machine cycle. Thus, hosiery is being placed against the Station I folding plate before the beginning of each machine cycle.

To further simplify the detailed description, a separate discussion of the operation of the electrical and pneumatic portions of this invention will be made.

Referring to FIG. 8, folding plates 1, 2 are shown in their initial positions at Stations I and II, respectively. The plates would be in the position shown before the beginning of a machine cycle. Insert fingers 3, 4 are shown in their vertical position at Station I as they would be prior to a type A fold. Normally, a cardboard insert would be held between insert fingers 3 and short fingers 4 at Station I, but has been deleted in this view for clarity.

Folding plate 1, to which insert fingers 3, 4 and folding fingers 5, 6 are pivotally connected, is rotatively mounted such that it may be turned clockwise about a centrally located axis 75. All folding plates (four in number) are interconnected by drive chains 7, 8 which move the plates from Station to Station.

Folding fingers 6 is offset from the other folding and insert fingers 3, 4, 5. Its function is to grip the heel portion of the hose in the case of a Type C fold (see FIG. 6).

Before beginning a machine cycle, the operator places the hosiery to be folded on top of a work table (not shown), with the foot portion resting on the upper side of folding plate 1. As previously explained, a variety of folds may be made by varying the foot fold at this point.

Actuation of the cycle switch by the operator begins machine cycle 1 and initially causes rod 9 of finger actuator cylinder 10 to move from right to left in FIG. 8. This causes rack lever 11 to rotate clockwise about lever pin 12 against spring 13. Projection 14 of rack lever 11 rises, striking lower rollers 76 of finger rack 15. Upward movement of finger rack 15 causes all vertical folding and insert fingers 3, 4, 5, 6 to pivot downwardly against the upper surface of folding plate 1. Hosiery previously placed against the plate by the operator is now gripped between the folding and insert fingers and the upper surface of the folding plate. It is pointed out that if insert fingers 3, 4 had already been lowered for Fold Types B or C, vertical movement of finger rack 15 would lower only folding fingers 5 and 6.

Switch plate 17 is fixedly attached to the righthand end of finger actuator rod 9. Travel of the piston from right to left operates limit switches 18 and 19 at the beginning and end of its travel, respectively. As will be explained in detail hereinafter, operation of limit switch 19 operates a clutch, connecting drive chains 7, 8 to the drive motor (not shown). Folding plate 1 is thereby moved from Station I to Station II to the position occupied by folding plate 2 in FIG. 8. At the end of machine cycle 1, folding plate 1 will have travelled to Station II and will have rotated 480° degrees, as illustrated by folding plate 2.

After the movement of folding plate from Station I to Station II, the hosiery placed on it is convolutely folded around the folding plate and the insert, with its welt hanging downward along the upper surface of the plate. This upward angle ensures that the hose will be held in position during the time the folding plate is at rest at Station II and also keeps the welt from being thrown over the folding plate when the plate stops. As folding plate 1 comes to rest at Station II at the end of run cycle 1, a jet of air is directed downwardly at the hose welt from nozzle 22. This ensures that the stopping of the folding plate rotation does not dislodge the fold and serves also to tighten the fold.

When the operator next trips the cycle switch beginning machine cycle 2, drive chains 7, 8 again move folding plate 1 to the right. Initial movement of the folding plate away from Station II causes rotation of the plate through the remaining 60 degrees to a horizontal position. As the plate rotates toward the horizontal, roller 77 of finger rack 20 strikes closing cam 21, raising finger rack 20 and causing folding and insert fingers 3, 4, 5, 6 to close downwardly upon the welt end of the hose. At the beginning of run cycle 2, a jet of air is again directed at the welt end of the hose from nozzle 22 to tighten the fold. The folding fingers close upon the hose at the end of the jet of air from nozzle 22, holding the fold tight.

FIG. 9 illustrates the turning cams and drive linkages for the folding machine. Drive chains 7, 8 link sprockets 78, 79, 80, 81 fixedly attached to drive shaft 25 and idle shaft 26. Drive shaft 25 is journalled and held in the vertical direction by upper and lower bearings 82, 27 bolted to upper and lower frame plates 28, 29, respectively. Similarly, idle shaft 26 is fixedly held in the vertical direction and journalled by upper and lower bearings 30, 31, also bolted to upper and lower machine plates 28, 29. Drive shaft 25 is connected through coupling 33, transmission 34, coupling 83 and brake and clutch 84 to folding motor 85. Motor 85 is continuously connected to line voltage and is, accordingly, always running while the machine is turned on. Brake and clutch 84 connect motor 85 to drive shaft 25 during each machine cycle.

Each folding plate is rotatively mounted on an associated arbor yoke 35, shown only partially in FIG. 9, which is in turn connected to drive chains 7, 8 by pins 36 placed on one side of arbor yoke 35. Additionally, each arbor yoke has four rollers 38 which travel along guide grooves around the machine, holding the folding plates horizontal along their rotational axes.

As will be discussed in detail in connection with FIG. 11, each folding plate has a pair of turning cam followers 40, 41 at its rearmost position. Followers 40, 41 alternately travel through the offset portions of turning cam 43 between Stations I and II during machine cycle 1, rotating their folding plates. Followers 40, 41 shown at Stations II in FIG. 9, are in the position 60 degrees to the horizontal that the folding plate occupies after coming to rest at Station II at the end of machine cycle 1. It may be seen that initial movement of the folding plate toward Station III during the successive machine cycle will complete the rotation of the folding plate to the horizontal.

As will be explained in detail, idle shaft 26 has a series of cams 520, 521 keyed to it which operate switches 522, 523. The switches are mounted on the shaft to provide various timing signals for the packaging section of this invention. Operation of the switches will be explained in detail in connection with the description of FIGS. 46 and 48.

Station III and IV of the folding machine are illustrated in FIG. 10. Folding plate 1 arrives at Station III at the end of run cycle 2 in a horizontal position with both sets of insert and folding fingers folded against opposite plate surfaces. At the end of run cycle 2, the folded hosiery and insert are stripped from the folding plate. The stripping operation will be discussed in detail in connection with FIG. 16.

The next actuation of the cycle switch, beginning machine cycle 3, causes the folding plate to advance from Station III to Station IV. In moving toward Station IV, roller 77 of finger rack 20 strikes opening cam 46, causing the upper set of folding and insert fingers to be raised. As soon as the fingers reach their uppermost position, they strike rubber bumper 47 which serves to immediately dampen any vibration which might otherwise be present after the fingers are opened. Similarly roller 76 of finger rack 15 strikes opening cam 48 just prior to the folding plate's reaching Station IV, opening the lower set of folding and insert fingers.

Folding plate 1 will be in the position shown at Station IV immediately upon arrival at the end of run cycle 3. At the end of the run cycle, plate 50 is moved inward, creating a V between insert fingers 3 and insert fingers 4. As will be hereinafter explained in connection with the discussion of FIG. 37, a cardboard insert is dropped into the V between the insert fingers from the insert feeder immediately above.

After the next actuation of the cycle switch, beginning machine cycle 4, folding plate 1 moves from Station IV to Station I. If a type A fold is to be accomplished, the insert fingers are to remain vertical until after the hose is positioned against the folding plate at Station I. To accomplish this cam wheel 52 is raised to the position shown by the solid lines in FIG. 10. At this height, the insert fingers will round the turn between Station IV and Station I without striking the cam. If fold types B or C are to be made, cam wheel 52 is lowered to the position shown in the dotted outline. When the folding plate rounds the turn from Station IV to Station I, all of the insert and folding fingers would be bent outwardly by the cam wheel (see also FIG. 39). Roller 77 of finger rack 15 bears against flat surface 54, ensuring that the folding fingers remain in a vertical position when the folding plate arrives at Station I. Insert fingers 3, 4 are not fixedly attached to finger rack 15 and are, therefore, free to fall against the upper surface of folding plate 1. In this way, they arrive at Station I in position for a type B or C fold.

Details of the folding plate and folding plate mounting are shown in FIG. 11. Arbor yoke 35 rotatively mounts folding plate arbor 57 in bearing 58. One pair of the arbor yoke arms are connected to drive chains 7, 8 through pins 36. The coupling between drive chains 7, 8 and the arms of arbor yoke 35 is pivotal so that the folding plates may traverse the round portions of their path. Follower plate 60 is fixedly attached to the innermost end of folding plate arbor 57. Each follower plate rotatively holds two turning cam followers 40, 41 through turning cam 43 from Station I to Station II during machine cycle 1, imparts the rotation of folding plate 1. The upper and lower surfaces 65 of arbor plate 60 are flattened as shown in FIG. 9. The flattened surfaces 65 ride end cams 66 (FIG. 9) as the folding plate is travelling from Station II to Station III and from Station IV to Station I during machine cycles 2 and 4. This holds the folding plate horizontal during these portions of its travel.

Folding plate yoke 67 is fixedly attached to the end of folding plate arbor 57. Plate brackets 68 attach folding plate 1 to plate yoke 67 to prevent stockings from falling on the rack gears. As shown in FIGS. 14 and 15, folding finger shafts 70, 71 are rotatively mounted in opposite ends of arm portions of plate yoke 67.

Finger racks 15, 20 mesh with spur gears 73, 74, respectively, which gears are fixedly attached to finger shafts 70, 71. As is readily seen, vertical movement of finger rack 15 or finger rack 20 causes rotation of folding finger shaft 70 or folding finger shaft 71, respectively.

Referring to FIG. 12, insert fingers 3, 4 are rotatively connected to finger shafts 70, 71 by finger blocks 90, 91. Thus, they are free to pivot from a raised position (as the lower set) to a folded position (as the upper set).

FIG. 13 illustrates the operative relationship between insert fingers 3, 4 and folding fingers 5. Folding fingers 5, 6 are fixedly connected to finger shafts 70, 71 by brackets 92, 93. As explained, the position of folding fingers 5, 6 is determined by vertical movement of finger racks 15, 20 and, accordingly, the angular position of finger shafts 70, 71.

Attached to brackets 92, 93 are holding magnets 95 positioned so as to be directly over finger blocks 90, 91. Magnets 95 are sufficiently strong to attract finger blocks 90, 91 and raise insert fingers 3, 4 from the horizontal when folding fingers 5, 6 are raised by finger racks 15, 20.

Figure 39:
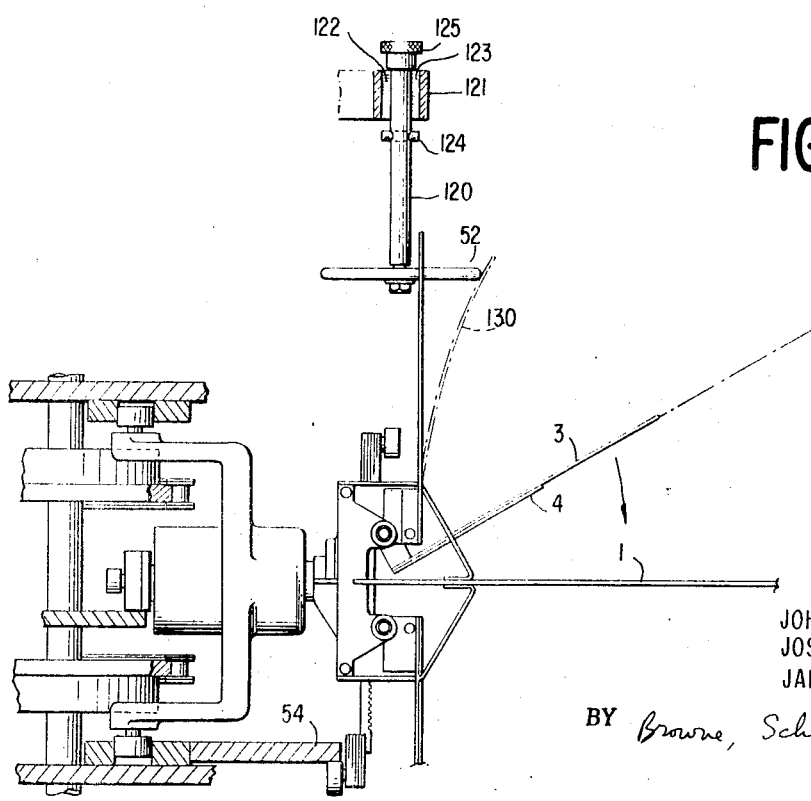
FIG. 39 illustrates the operation of the type fold cam wheel at Station III.

Referring to FIG. 39, wheel cam 52 is shown in its lowered position to rotate insert fingers 3, 4 downwardly against folding plate 1. Cam 52 is affixed to the lower end of shaft 120 which is loosely held in cam holder 121. Slots 122, 123 are provided at opposite points in the bore through holder 121 so that pin 124 may be raised. To raise cam 52 so that insert fingers 3, 4 remain vertical when the folding plate reaches Station I, knob 125 is manually lifted to pull pin 124 through slots 122, 123. By rotating knob 125 slightly, pin 124 will rest against the upper side of holder 121, serving to keep cam 52 above the path of the folding and insert fingers 3, 4, 5, 6.

When lowered, wheel cam 52 moves folding and insert fingers 3, 4, 5, 6 outward, as shown by the dotted line 130 in FIG. 39. Finger blocks 90, 91 (FIG. 13) rotate away from magnets 95, breaking the magnetic hold and allowing insert fingers 3, 4 to pivot downwardly against the folding plate.

(3) Fold stripping

Figures 16, 17:
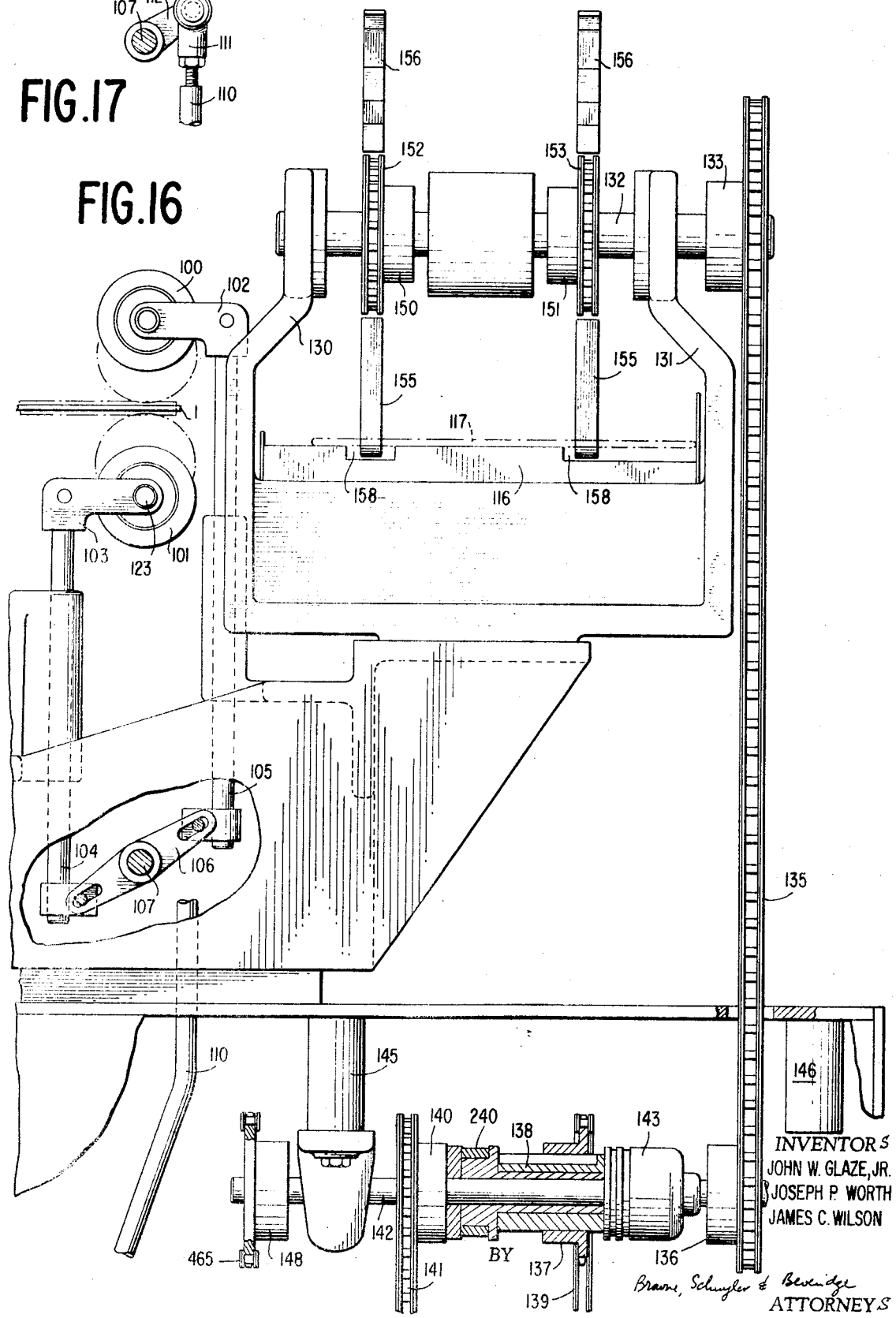
FIG. 16 is an end view of the conveyer assembly and illustrates the stripping roller actuating mechanism.
FIG. 17 is a detailed view of a portion of connecting linkage of the strip roller actuating mechanism.

FIG. 16 illustrates the mechanism for actuating the stripping rollers at Station III. Holding plate 1 arrives at Station III at the end of run cycle 2 in a horizontal position with both sets of folding and insert fingers bearing against opposite sides of the plate. Upper and lower stripping rollers 100, 101 are rotatively mounted in roller yokes 102, 103 away from folding plate 1 until the latter has come to rest. Each roller yoke is connected at its ends via actuating arms 104, 105 to roller crank 106, one of which is keyed to each end of crank shaft 107.

As will be explained hereafter in connection with the discussion of FIG. 23, roller actuating link 110 is cam driven to travel downward at the end of run cycle 2. As shown in FIG. 17, link 110 is connected to crank shaft 107 by an adjusting link 111 pivotally connected to crank 112 attached to crank shaft 107. When roller link 110 travels downward, crank 112 rotates crank shaft 107 clockwise. This motion is transmitted to actuating arms 104, 105 by the two roller cranks 106. Actuating arm 104 travels upward, pressing lower strip rollers 101 against the underneath side of the folded hose. At the same time, actuating arm 105 lowers upper stripping roller 100 against the upper side of the hosiery fold.

As illustrated in FIG. 18, upper and lower strip rollers 100, 101 consist of a plurality of rollers spaced to fit in the end cutouts 115 of the folding plate (see FIG. 19). Each stripping roller is made of a very soft rubber or cellular plastic material, so that the stocking will not be damaged as it is stripped from the folding plate.

Referring to FIG. 19, upper strip rollers 100 are shown mounted on shaft 120 which is journalled at its ends 121, 122 in upper roller yokes 102. Lower rollers 101 (see FIG. 16) are similarly mounted on shaft 123, journalled at its ends in lower roller yoke 103. Shaft 123, however, carrying lower rollers 101, projects through the right hand yoke 103 (as seen in FIG. 19) and is keyed to sprocket 125.

As will be explained in connection with the discussion of FIG. 23, sprocket 125 is rotated by a chain connected thereto during the entire machine cycle, that is during the cycle shaft revolution.

Rotation is coupled to the upper strip rollers by a pair of drive wheels 127 keyed to upper and lower roller shafts 120, 123. When sprocket 125 is rotated, drive wheels 127 are in contact and rotate in opposite directions, ejecting the folded hose onto conveyer tray 116 as indicated by dotted outline 117 (FIG. 16). The folded hose is ejected onto the conveyer tray near the end of machine cycle 2 and remains there until the beginning of run cycle 3.

It is pointed out that in those instances when the overwrap feeder is in use, an overwrap would be fed onto conveyer tray 116 at the beginning of run cycle 2. When the hosiery is stripped at Station III at the end of machine cycle 2, the hosiery would drop onto the overwrap on conveyer tray 116 and remain until the beginning of run cycle 3.

(4) Package conveyer and bagging

FIG. 16 illustrates an end view of the conveyer. Conveyer support arms 130, 131 rotatively mount conveyer drive shaft 132. Shaft 132 is driven by sprocket 133 keyed to the shaft at its outermost end. Sprocket 133 is linked via chain 135 to sprocket 136 which is keyed to clutch shaft 142.

Input sprocket 137, keyed to sleeve assembly 138, is continuously driven by the packaging machine motor (FIG. 23) via a gear box and chain 139. Cycle shaft drive sprocket 140, driving chain 141, is also keyed to clutch shaft 142. Sleeve assembly 138 is connected to the input side of clutch 143, the output of which is keyed to shaft 142. As will be explained in connection with the discussion of FIG. 46, clutch assembly 143 is electrically engaged. When unengaged, shaft 142 is not connected to input sprocket 137 and is stationary. When clutch assembly 143 is engaged, shaft 142 turns with drive sprocket 137. Shaft 142 is journalled in main support bearings 145, 146, the latter being only partially shown in the figure. Eccentric 240, connected to sleeve assembly 138, drives the leveling rack for the hosiery bag and overwrap lifts. Also, as will be explained in connection with the discussion of FIG. 40, sprocket 148, also keyed to shaft 142, supplies power for the L-board insert unit.

Conveyer drive shaft 132 is keyed to conveyor drive sprockets 150, 151. Conveyer chains 152, 153 link the conveyer drive sprockets with idler sprockets at the opposite end of the conveyer. When stripping rollers 100, 101, remove the hosiery fold from folding panel 1, it is ejected onto conveyer tray 116 as indicated by dotted outline 117. The folded hose lies in this position until the beginning of run cycle 3. Then, clutch assembly 143 engages rotating conveyer drive shaft 132. Package grippers 155, 156 attached to conveyer chains 152, 153 travel in slots 158, provided for that purpose in conveyer tray 116. The grippers move the folded hosiery toward the bagging section.

Referring to FIG. 18, conveyer chain 153 links conveyer drive shaft 132 with idler sprocket 160. The entire conveyer assembly is supported by drive shaft 132 and locking shaft 161. In the event of a package jam in the conveyer section, locking shaft handle 162 may be rotated counterclockwise and the entire conveyer assembly pivoted upward about conveyer drive shaft 132.

Referring to FIG. 19, lock shaft 161 is held down by clamps 165, 167. Each clamp is shaped to match notches cut in the underneath side of lock shaft 161. Accordingly, when handle 162 rotates shaft 161 so that the clamps are lined up with the notches in the shaft, the conveyer unit may be pivoted upward.

Idler sprockets 160, 170 are rotatively mounted in conveyer member 171. Member 171 is slotted to receive bolts 172 which connect it to main conveyer member 175. Bolt 176, threaded into main conveyer member 175, bears against member 171 and adjusts the tension of conveyer chains 152, 153.

As will be explained in connection with a discussion of FIG. 46, a photocell interlock circuit on the conveyer section prevents opening of the uppermost bag in the bagging section in the event folded hosiery is not deposited on conveyer tray 116 at the end of machine cycle 2. Referring to FIG. 18, light source 180 directs a beam through aperture 181 in conveyer tray 116 towards photocell 182. If no package is ejected onto conveyer tray 116, the photocell relay remains energized, stopping the bag opening procedure.

Referring to FIG. 18, bag hopper 191 is a frame-like box having open sides and a vertically movable bottom plate 525. Hopper 191 may be manually removed and rests on brackets 526, 527 on bagging section frame member 528. When the hopper is empty, rack plate 192 may be lowered, as will be explained below. Rack plate 192 then lies against the upper surface of member 528, allowing the hopper to be removed for refilling.

Hosiery bags 190 are stacked in hopper 191 on top of bottom plate 525 supported vertically by rack plate 192 which is moved by rack 193. Bags 190 are generally of a pliable plastic material but other types of bags may be used with this invention. Each bag is rectangular and has an end flap which may be folded over for sealing. The bags are stacked in hopper 191 with their end flaps extended from the underneath side of the bag and the bag mouths toward Station III. Flap weight 195 rests in hopper 191 on the end flaps of the bags and contours the bag flap in such a manner that the air jet will open the uppermost bag. The flap weight also helps to hold the uppermost bag while the folded hosiery is being inserted.

Figure 20:
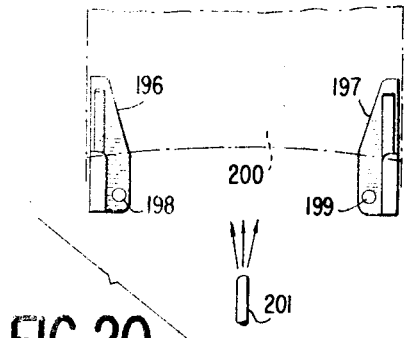
FIG. 20 is a view of the bag opening fingers and air jet.

As shown in FIG. 19, bag opening fingers 196, 197 rotate on their vertical axes 198, 199. Referring now to FIG. 20, the bag fingers pass above flap 200 and project approximately one inch inside the bag. Immediately before, a jet of air is directed at the bag from nozzle 201, causing the bag mouth to open widely. The folded hose and insert are then pushed into the bag through guides 242, 243 (FIG. 19) by conveyer grippers 55 or 56. When the folded hose strikes the end of the bag, the conveyer gripper push the entire package toward the sealing station. Sealing station conveyer 296 (FIG. 30) carries the bag until it comes to rest against a bag stop.

Figure 21:
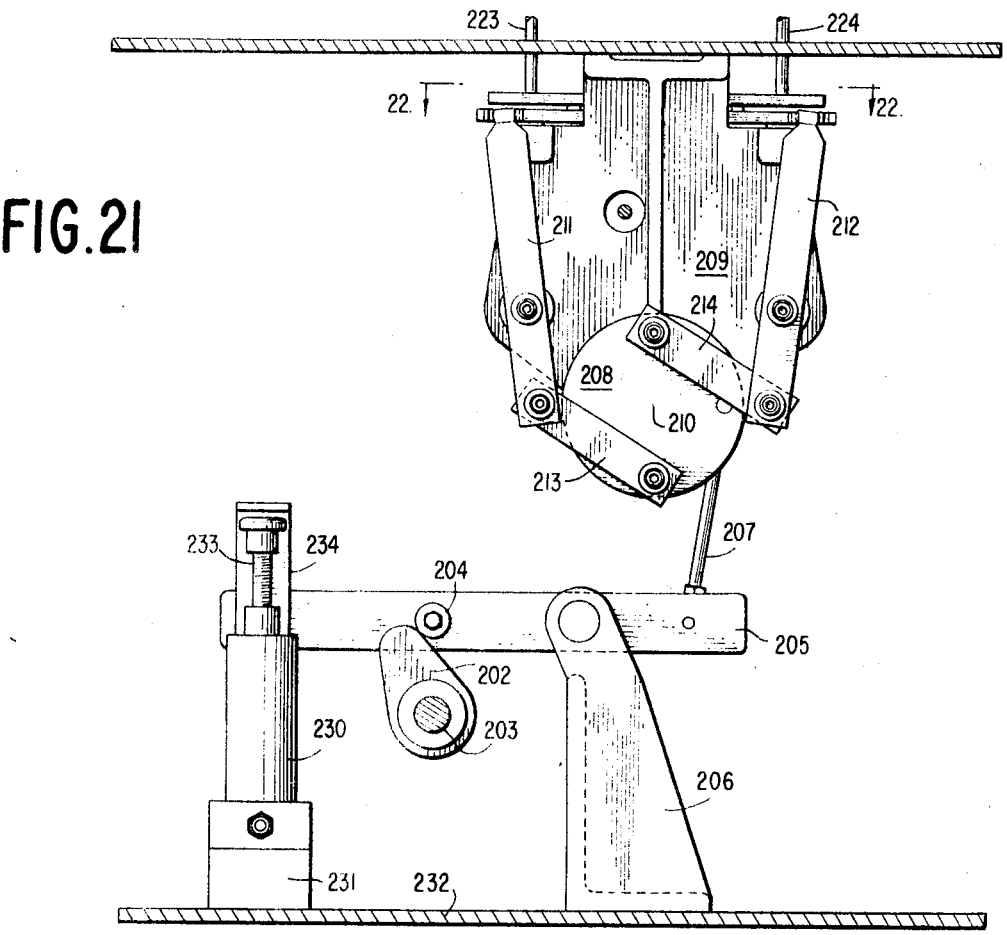
FIG. 21 is a view of the cam operated linkages for actuating the bag opening fingers.

Referring to FIG. 21, bag finger cam 202 is keyed to cycle shaft 203. As will be explained in detail in connection with the discussion of FIG. 23, cycle shaft 203 undergoes one complete rotation for each machine cycle. During each machine cycle, finger cam 202 strikes follower 204, causing arm 205 to rotate clockwise about mount 206. Rotation of arm 205 in a clockwise direction moves link 207 downward, causing plate 208 to rotate on a clockwise direction.

Plate 208 is rotatively mounted on frame member 209 at its center axis 210. Connecting links 211, 212 are pivotally mounted on member 209 and connected to plate 208 by tangential links 213, 214. Clockwise rotation of plate 208 causes the upper ends of links 211, 212 to move inwardly.

Figure 22:
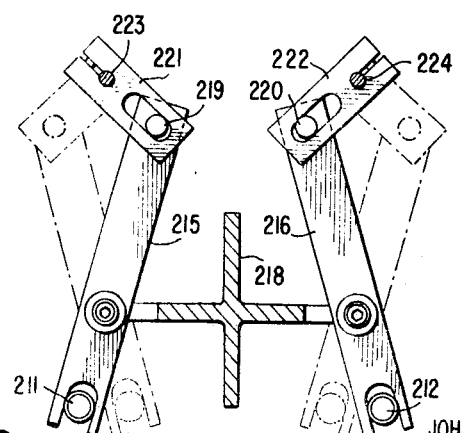
FIG. 22 is a vertical view of the linkages of FIG. 21 taken along the line 22—22 of FIG. 21.

Referring to FIG. 22, the upper ends of links 211, 212 fit into end slots in horizontal links 215, 216 pivotally connected to machine frame member 209. Inward movement of links 211, 212 cause outward horizontal rotation of the opposite ends of horizontal links 215, 216. Cam rollers 219, 220, engaged in slots of actuating links 221, 222 cause bag finger shafts 223, 224 to rotate fingers clear of bag so air jet can open uppermost bag.

Bag fingers 196, 197 are in an open position (as shown in FIG. 19) for the majority of each machine cycle. When they are rotated by cam 202 to their closed position momentarily, the uppermost bag in hopper 191 is opened by an air jet. The bag fingers then open into the inflated bag and hold the bag open to receive the folded hosiery.

Referring to FIG. 18, bag switch 226 is mounted on conveyer member 175. Switch arm 227 rests on the top of bag stack 190 and, as will be explained in connection with FIG. 46, operates bag switch 226 to control the vertical height of rack plate 192.

Referring again to FIG. 21, solenoid operated air cylinder 230 is vertically held in mounting bracket 231 affixed to frame 232. Rod 233 of the air cylinder rises vertically when actuated. L-bracket 234 is attached to arm 205 and situated so as to be raised by actuation of air cylinder 230. This allows manually cycling of the bag opening fingers.

Figure 23:
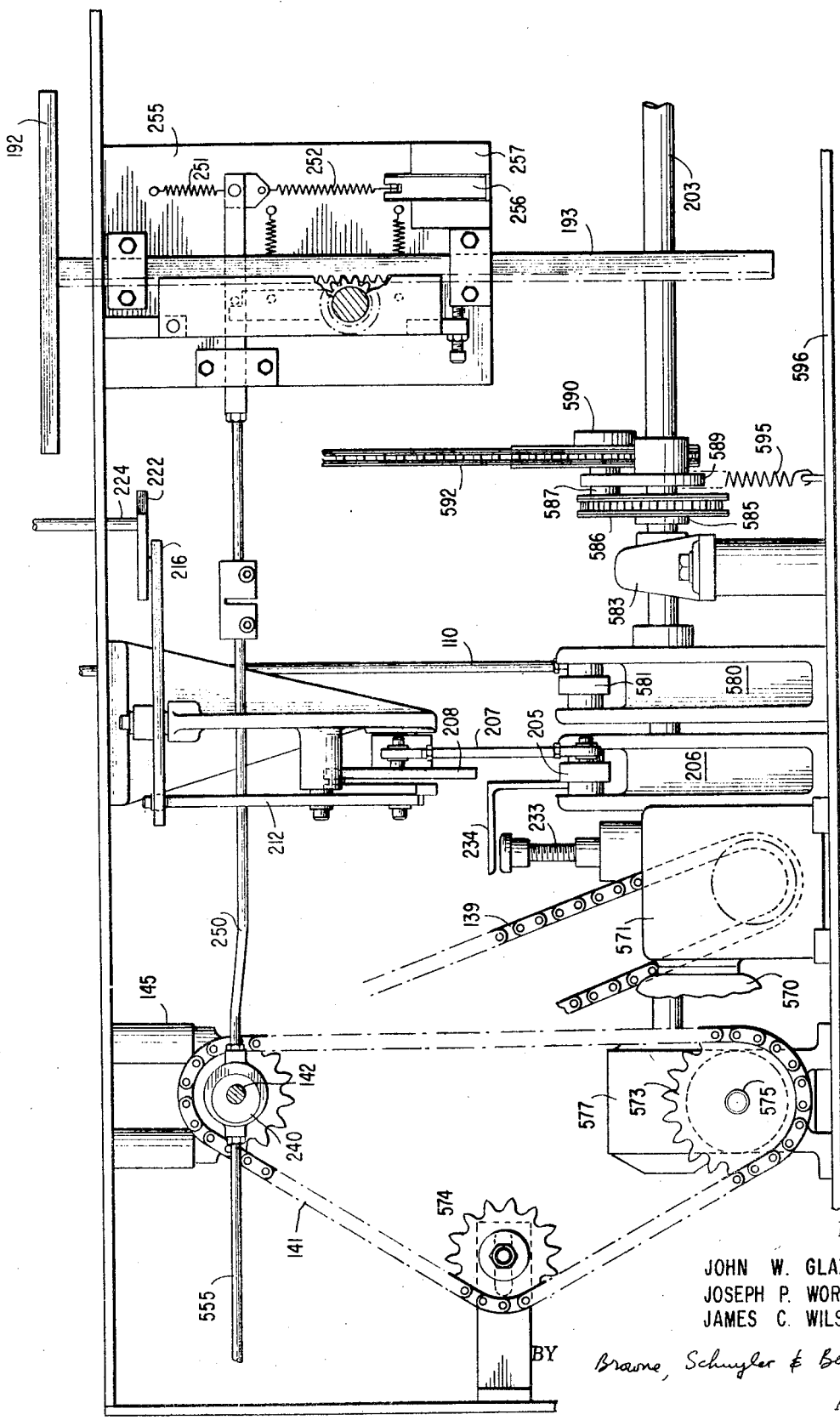
FIG. 23 is a side view, partly in cross-section, of the bag lift and cycle shaft assemblies.

Referring now to FIG. 23, eccentric 240 is mounted on clutch shaft 142. As was explained in connection with the discussion of FIG. 16, eccentric 240 is connected directly to input sprocket 137 and rotates continuously. This causes connecting link 250 to oscillate in a generally horizontal direction. The end of connecting link 250 opposite eccentric 240 is held in the vertical direction by springs 251, 252. Spring 251 connects link 250 to frame 255 of the bag lift mechanism. Spring 252 connects link 250 to armature 256 of solenoid 257. When solenoid 257 is energized, as shown in FIG. 23, link 250 is pulled downward against the restraining action of spring 251. When solenoid 257 is not energized, the end of link 250 opposite eccentric 240 rises.

Referring to FIG. 24, the end of link 250 is allowed to move vertically between the limits established by keeper 260. When solenoid 257 is energized, armature 256 retracts to the position shown. In this position, pin 261 in link 250 rests in notch 263 of link 265. Horizontal oscillation of link 250 is connected to link 265 by pin 261, causing the latter to pivotally oscillate about rack shaft 266. Link 265 is urged toward the rack by spring 270.

As shown in FIG. 25, when link 250 is pulled upward by spring 251, pin 261 is raised above notch 263. Thereafter, horizontal motion of link 250 is not coupled to link 265. As will be explained in detail in connection with the discussion of FIG. 46, sensing switch at the bagging station energizes solenoid 257 whenever it becomes necessary to raise the height of the bags in the bag hopper. At all other times, link 250 is in the position shown in FIG. 25 and the bag rack is stationary.

As shown in FIG. 26, rack shaft 266 is connected to spur gear 275 by key 276. Link 265 is connected to shaft 266 by a one-way clutch 277. Action of clutch 277 allows link 265 to turn spur gear 275 in one direction only. Accordingly, pivotal oscillations of link 265 turn spur gear 275 and raise rack 193.

Shaft 266 is mounted between front and back mounting plates 278, 279, respectively. Shaft 266 is journalled in back plate 279 but is connected to front plate 278 by a second one-way clutch 280. Clutch 280 allows shaft 266 to rotate in one direction only, counterclockwise in FIG. 24. This insures that rack 193 does not drop to its original position during the return portion of the cycle of link 265.

As shown in FIG. 27, front and back plates 278, 279 are pivotally mounted to frame member 283 by pin 284. Spring 285 (FIG. 24) urges the assembly toward rack 193, keeping gear 275 meshed with the rack. However, when a bag hopper becomes empty, rack 193 and rack plate 192 (FIG. 18) must be lowered below bottom plate 290 of the hopper so that the hopper box 191 may be removed. To accomplish this, shaft 266 is moved out of engagement with rack 193 by pivoting the assembly away from the rack about pin 284. The rack then drops to its lowermost position. Rack plate 192 opens switch 291 (FIG. 18) to deactivate solenoid 257.

When a full hopper is inserted into the machine, rack 193 must be raised so that the uppermost bag is at the proper position. To accomplish this, crank 293 is rotated manually to raise rack 193 and rack plate 192 until switch 291 closes. Then, bags feed up automatically to a height determined by rod 227 and switch 226.

(5) Package sealing and stacking

After the folded hosiery is inserted into a bag at the bagging station, the conveyer continues to push the bagged hosiery to the sealing station, shown in FIG. 28. There, the bag passes onto packaging conveyor 296 which runs clockwise in the figure. Packaging conveyer 296 begins to run at the beginning of each run cycle and stops at the end of the machine cycle. The bag travels along packaging conveyer 296 until it strikes bag stop 297. The bagged hosiery stops at this point until the beginning of the next run cycle.

Bag stop 297 is located so that the open flap of the hosiery bag is resting on flap plate 298. Plate 298 is connected to end shafts 299 journalled in arms 300.

Midway through the next run cycle, plate 298 is rotated 180 degrees clockwise to close the bag flap against the upper side of the bag. At that point, a cam surface on cycle shaft 203 (FIG. 23) causes vertical link 301 to travel downward. Link 301 is connected to sealing member 302 upon which sealing iron 303 is mounted. Sealing iron 303 presses against the bag flap for an exact period of time, fusing the flap to the side of the bag.

After link 301 raises sealing iron 303 and flap plate 298 is retracted, bag stop 297 raises, as shown in FIG. 29. The packaged hosiery is moved by conveyer 296 and upper roller 305 onto bag retaining plates 306. Plates 306 hold the hosiery package until the end of machine cycle 4. At the end of the machine cycle, bag retaining plate 306 pivots outward, dropping the packaged hosiery onto a stack 307 in package holder 308. The packaged bags then may be removed from the package holder for shipment.

Figure 31:
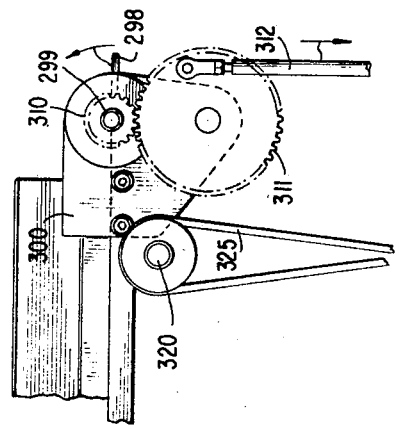
FIG. 31 is a detail view of the sealing actuating linkages.
Figure 30:
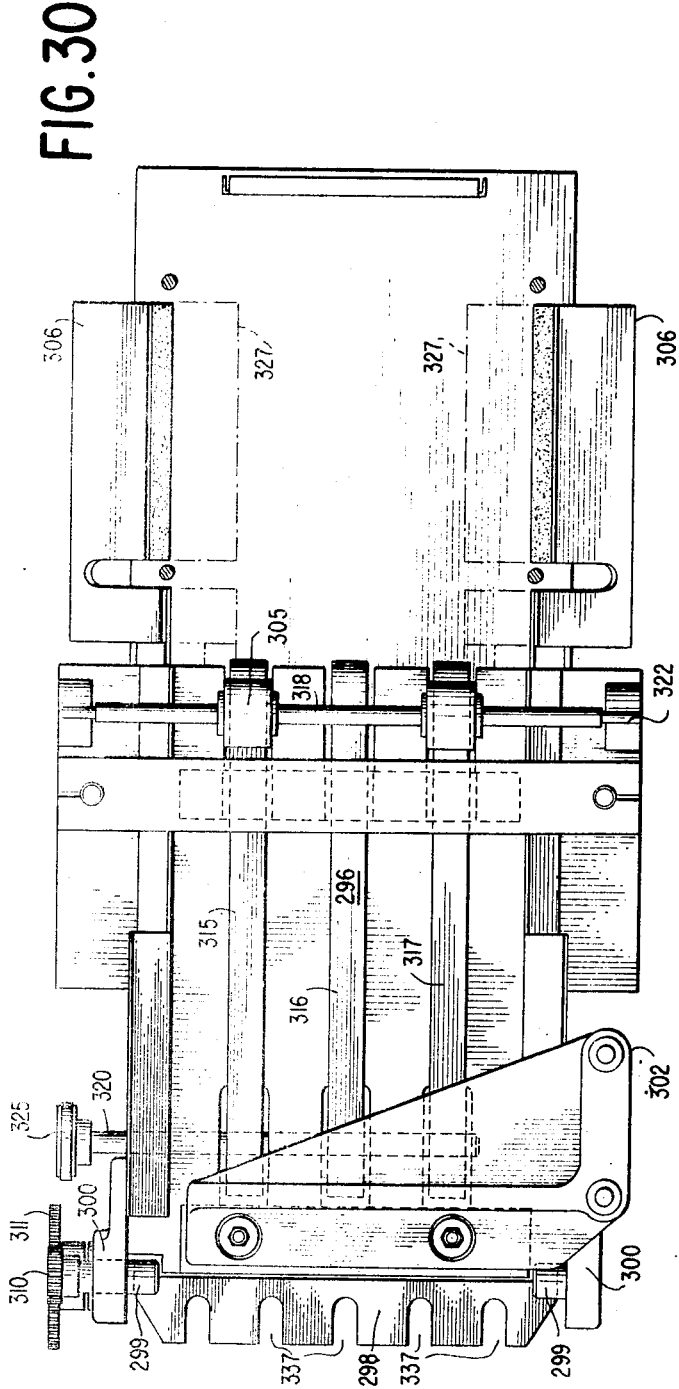
FIG. 30 is a vertical view of the sealing station and package receiving hopper.

FIG. 30 is a vertical view of package conveyer 296. Flap plate 298 is fixedly mounted to end shafts 299 rotatively held in arms 300. The uppermost end shaft 299 is keyed to gear 310 which is in turn meshed with spur gear 311. As shown in FIG. 31, spur gear 311 is connected to actuating link 312. When link 312 moves downward, spur gear 311 rotates clockwise, causing gear 310 and end shaft 299 to rotate counterclockwise 180 degrees. This causes flap plate 298 to fold the bag flap against the side of the bag.

The package conveyer consists of three conveyer belts 315, 316, 317 rotating between drive shaft 320 and idle shaft 322 (FIG. 29) at the opposite end of the conveyer. Upper rollers 305 are mounted above conveyor belts 315, 317 on shaft 318. Ends of shaft 318 are rotatively held in slots 322 (FIG. 28) in conveyer side members 305.

Package conveyer drive shaft 320 is connected by V-belt 325 to a tension drive assembly on the cycle shaft. As will be explained in detail in connection with the discussion of FIG. 23, the drive assembly drives package conveyer 296 from the beginning of a run cycle to the end of a machine cycle.

When a sealed bag leaves the package conveyer, it rests on bag retaining plates 306 which are in a closed position, as shown by dotted lines 327, at the end of a run cycle. After the sealed bag is completely moved onto the bag retaining plate 306, the plates are caused to open to the position shown in solid lines in FIG. 30, causing the bag to drop to the stack below.

Figure 32:
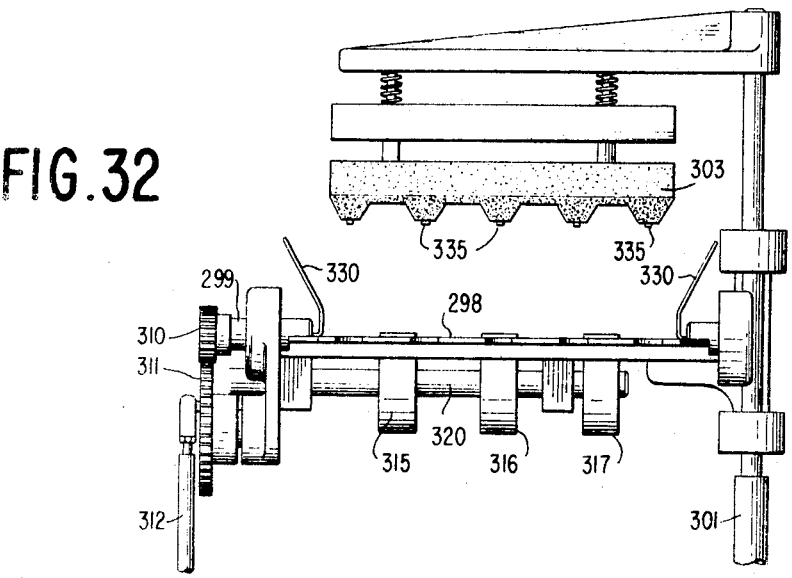
FIG. 32 is an end view of the sealing iron mounting assembly.

FIG. 32 illustrates sealing iron 303 in a raised position. Guides 330 insure that the sealed bag is properly centered on the packaging conveyer before the bag abuts bag stop 297 (FIG. 29). Sealing iron 303 is equipped with five sealing tips 335. After flap plate 298 has closed the flap against the side of the bag, sealing iron 303 is lowered by link 301 until sealing tips 335 are in contact with the bag through slots 337 in plate 298.

Sealing iron 303 is maintained in contact with the plastic flap long enough to fuse the portions of the bag flap immediately adjacent sealing tips 335 to the bag side underneath. Sealing iron 303 is preferably coated with a material such as Teflon so that sealing tips 335 will not adhere to the bag. It is important that sealing iron 303 be raised as soon as the bag flap is sufficiently bonded to the bag side so that the bag does not melt and stick to the folded hosiery inside. It has been found that a sealing iron temperature of approximately 315 degrees Fahrenheit and a sealing time of .15 second is suitable for this purpose. It is recognized that both temperature and sealing time may be varied as long as the other is varied accordingly. Thus, if sealing time is increased appreciably, sealing iron temperature must be lowered.

Figure 33:
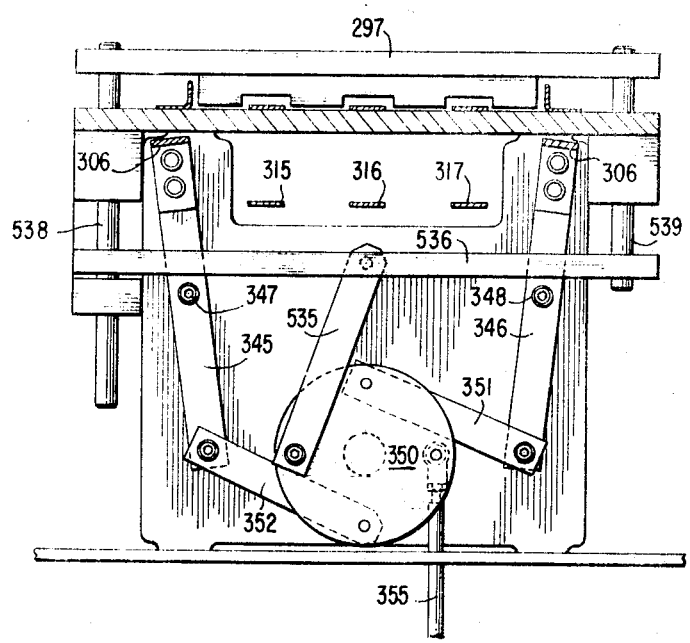
FIG. 33 is a cross-sectional view of the sealing station illustrating the linkages which operate the bag stop and bag retaining plates.

Referring to FIG. 33, package conveyer belts 315, 316, 317 carry the hosiery package until it abuts stop 297 at the end of machine cycle 3. As explained above, the package rests here until the following cycle. After the package is sealed about midway through machine cycle 4, stop 297 rises and package conveyer 296 carries the bag onto bag retaining plate 306.

Both bag stop 297 and bag retaining plates 306 are operated by wheel 350. Link 355 is actuated by a cam surface on the cycle shaft (not shown). In the position shown in FIG. 33, stop 297 is closed and retaining plates 306 are open. Approximately half way through a machine cycle, link 355 is lowered by a cam surface on the cycle shaft. Wheel 350 rotates clockwise about its center. Tangential links 351, 352, connected on the lower ends of pivotal links 345, 346, rotate links 345, 346 about pins 347, 348. This moves the upper ends of bag retaining plates 306 inward, closing the bag drop.

At the same time, tangential link 535 moves stop bar 536 upward. Bar 536 is attached to stop 297 by rods 538, 539 and moves stop 297 upward, releasing the sealed bag. Package conveyer 296 then moves the sealed bag onto bag retaining plates 306.

(6) Insert and overwrap feeding

As was explained in connection with the description of FIGS. 2 through 7, a paperboard insert is always introduced onto a folding plate at Station IV. Inserts consist of flat rectangular sections of paperboard of approximately the same size as the finished package. These inserts are fed into the insert fingers by an insert feeder at Station IV. Some hosiery mills sell packaged hosiery which is flat-folded inside a paper or cardboard overwrap with an extended flap at one or both ends. Such overwraps are referred to as L-boards, J-boards, V-boards, U-boards, etc. This invention is capable of producing a hosiery package utilizing these overwraps. For this purpose, a special overwrap feeder is attached to the folding machine near Station III. Hosiery is fed to the machine at Station I in the usual manner and is folded about the folding plate and standard insert. When upper and lower strip rollers strip the folded hosiery and insert from the folding plate at Station III, the hosiery is ejected onto an overwrap. The overwrap feeder is timed to feed an overwrap onto the conveyer tray beneath the strip rollers immediately before the folded hosiery is stripped.

The standard insert feeder is shown in FIGS. 23 through 38. Referring to FIG. 34, a supply of standard boards 370 is shown between roller 371 and backplate 372. Air cylinder 373, attached to back member 374 of the feeder frame, maintains a constant pressure on backplate 372 via cylinder rod 375. This feeds the inserts forward as they are removed from the supply one by one.

Referring to FIG. 35, in the first portion of a run cycle upper feed roller 377 is rotated counterclockwise, feeding the outside card. Roller 377 is rotated sufficiently to feed an insert between lower feed roller 381 and idle roller 383.

Referring to FIG. 36, air cylinder 385 is mounted on lower member 386 of the insert feeder by bracket 387. Cylinder rod 390 is connected to pivot plate 391, pivotally mounted. When the head-end of cylinder 385 is pressurized, cylinder rod 390 is extended, causing plate 391 to pivot counterclockwise.

Referring again to FIG. 35, when the rod-end of air cylinder 385 is pressurized, plate 391 is pivoted away from the vertical, holding idle roller 383 away from lower feed roller 381. At the beginning of a run cycle, upper feed roller 377 feeds the outermost insert into the space between lower feed roller 381 and idle roller 383. Roller 377 ceases rotating while it still holds the insert, which remains in this position until the end of the run cycle.

Referring to FIG. 34, the insert feeder is shown with cylinder 385 activated to extend rod 390 at the end of a run cycle immediately after a folding plate has arrived at Station IV. As shown in FIG. 35, as insert fingers 3, 4 come to rest at Station IV, they are spaced behind insert plate 50. Referring again to FIG. 34, when cylinder 385 is energized to extend rod 390, insert plate 50 moves inward, forming a V between insert fingers 3 and 4.

Insert plate 50 is mounted on arm 395 pivotally mounted on pin 396 attached to the insert feeder frame. Crank 397 is connected via links 398, 399 and crank 400 to the end portions of cylinder rod 390. When cylinder 385 is energized to extend rod 390 at the end of a run cycle, idler roller 383 moves against lower feed roller 381 gripping the previously fed board therebetween. At the same time, insert plate 50 opens a V between the insert fingers. Lower feed roller 381 is then rotated counterclockwise, feeding the card into the V formed between insert fingers 3, 4. At the beginning of the machine cycle, cylinder 385 retracts rod 390 and returns to the position shown in FIG. 35. Insert plate 50 moves outward, allowing insert finger 3 to spring forward, gripping the board between itself and shorter insert finger 4.

Figure 37:
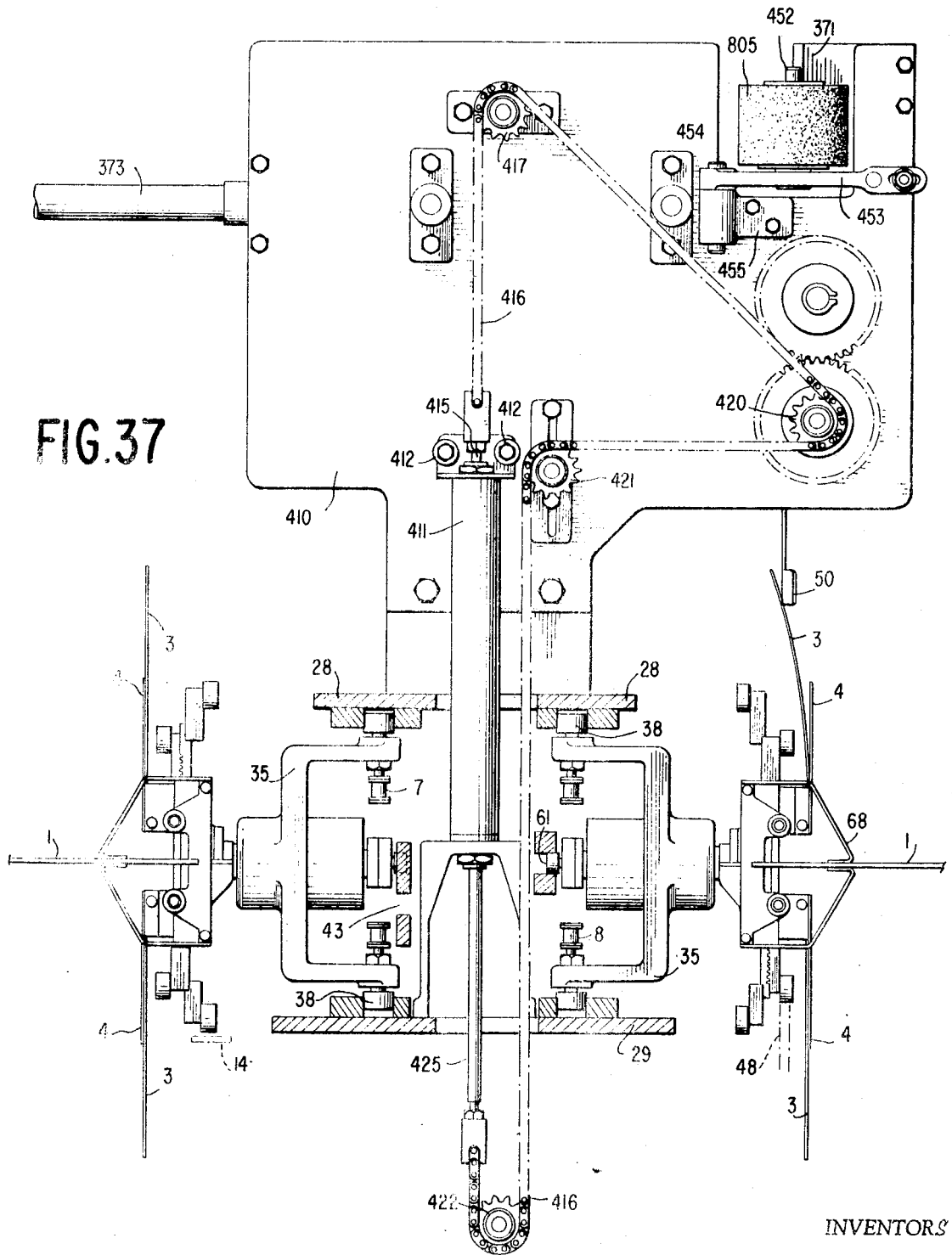
FIG. 37 is an exterior side view of the mounting and drive portions of the standard insert feeder.

Referring to FIG. 37, insert feeder frame 410 is fixedly attached to upper folding machine frame plate 28. Air cylinder 411 is mounted at its upper end to inserter frame 410 by bolts 412 and at its lower end to inserter frame 410 by bolts 412 and at its lower end to the folding machine frame. Upper cylinder rod 415 is connected to chain 416 which is linked to idler sprocket 417. Chain 416 also links feed roller drive sprocket 420, idler sprockets 421, 422 and connects to lower rod 425 of air cylinder 411.

When air cylinder 411 is activated to drive rod 415 upward, roller drive sprocket 420 is turned in a clockwise direction. When air cylinder 411 is energized in the opposite direction, driving the lower rod 425 downward, roller drive sprocket 420 rotates in a counterclockwise direction.

Figure 38:
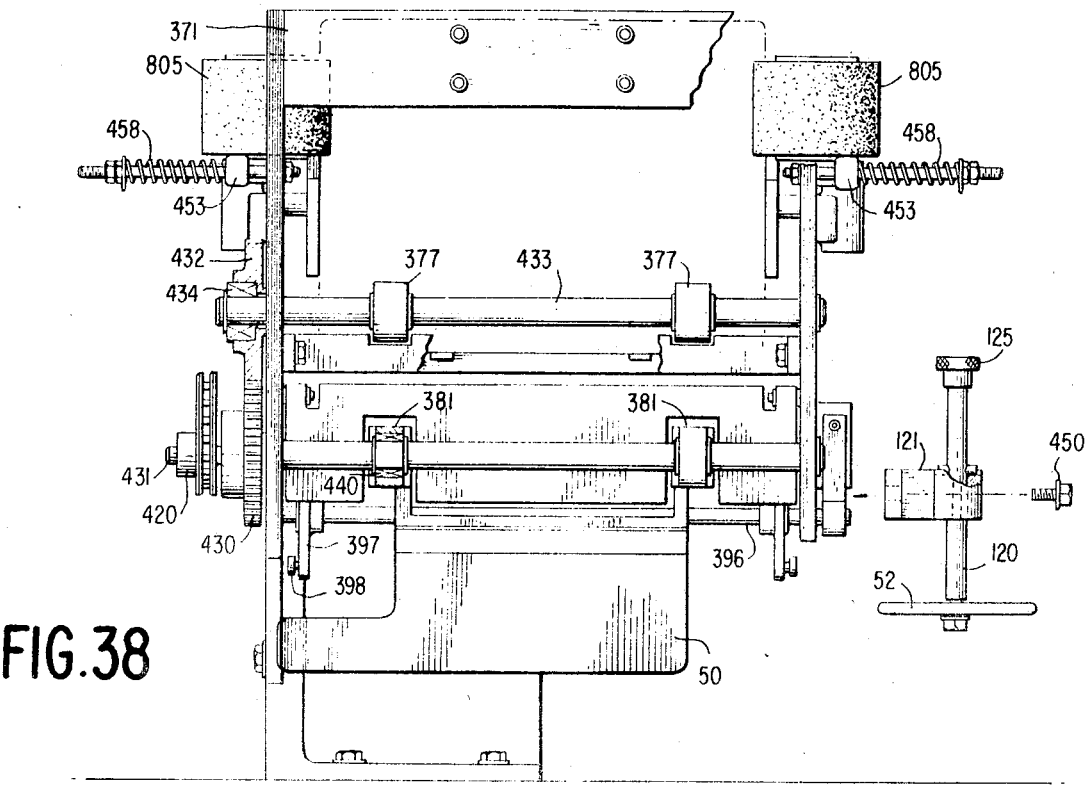
FIG. 38 is a front view of the standard insert feeder.

Referring to FIG. 38, drive sprocket 420 is keyed along with spur gear 430 to lower roller shaft 431. Spur gear 430 is meshed with gear 432 connected to upper roller shaft 433 by one way clutch 434. Upper feed rollers 377 are keyed to roller drive shaft 433. Lower drive rollers 381 are connected to shaft 431 by one way clutches 440.

Clutches 434, 440 are so arranged that when air cylinder rod 415 travels upward during the beginning of a run cycle, motion is coupled to upper feed rollers 377 but not to lower feed roller 381. Thus, upper rollers 377 feed a board downward, rollers 381 remaining stationary. Similarly, when cylinder rod 425 (FIG. 37) travels downward, lower rollers 381 rotate, feeding the insert into folding plate insert fingers below. During this portion of the machine cycle, clutch 434 holds upper rollers 377 stationary.

As illustrated in FIG. 38, fold type cam wheel 52 is mounted on inserter frame by bolt 450. As previously explained, the vertical position of type fold cam 52 determines whether insert fingers 3, 4 arrive at Station I in a vertical or horizontal position.

Referring to FIG. 37, rollers 371, are pivotally mounted on pin 542 attached to arm 453. Arm 453 is pivotally mounted on pin 454 attached to bracket 455 which is bolted to the insert feeder frame. Cylinder 373 pushes the board supply forward against stop member 371 and rollers 805. As shown in FIG. 38, rollers 805 are urged inward by spring 458. Rollers 805 provide restraint so that the inserts will feed one at a time.

As discussed previously, this invention is capable of producing a hosiery fold including special overwraps. As illustrated in FIG. 18, overwrap feeder frame 465 is mounted adjacent Station III so that output tray 466 of the overwrap feeder abuts conveyer tray 116. The feeder places a single overwrap on the conveyer tray 116 prior to the stripping operation. When folded hosiery is striped from the folding plate at Station III, the hosiery drops onto the previously placed overwrap rather than upon conveyer tray 116.

Referring to FIG. 16, sprocket 148 is keyed to clutch shaft 142. Shaft 142 rotates sprocket 148 from the beginning of each run cycle to the end of the machine cycle. Chain 465 connects sprocket 148 to sprocket 466 of the overwrap feeder (FIG. 40). Sprocket 466, keyed to shaft 467, drive chain 470 (FIG. 41) during each machine cycle after the start of the run cycle. Chain 470 links shaft 467 and roller sprocket 471 via tensioning sprocket 472. Sprocket 471 turns drive roller 473, keyed to shaft 474. Idle roller 475, rotatively mounted on pivotal arm 476 bears against the underneath side of drive roller 473. Pivotal arm 476 is keyed to crank 477 which is urged clockwise by spring 478. This serves to keep drive roller 473 and idle roller 475 abutting at all times.

Referring to FIG. 42, shaft 474 is linked to shaft 480 by chain 481 linking sprockets 482, 483, keyed to shafts 480, 474, respectively. Shaft 480 is rotatively mounted in side plates 485, 486 of the overwrap feeder. Sprocket 487, keyed to shaft 480 at its center, drives feed roller shaft 488 via chain 489. Rotation of shaft 488 turns feed rollers 490.

Referring again to FIG. 40, overwraps 492 are stacked in the feeder on rack plate 493. As will be explained hereafter, rack plate 493 lifts the stack of overwraps vertically as successive overwraps are fed from the top. Rotation of rollers 490 feed the uppermost board into the bite of rollers 473, 475, the latter rollers feeding the overwrap on the conveyer tray 116 at Station III.

As illustrated in FIGS. 43 and 44, rollers 490 may be pivoted upward about shaft 480. As will be explained hereafter, a cam surface causes the roller assembly to travel between the positions shown in FIGS. 43 and 44. After the end of a run cycle, when an overwrap is to be fed, the cam surface lowers roller 490 to the position shown in FIG. 43. Chain 489 turns rollers 490 counterclockwise, feeding the uppermost insert toward roller 473.

Referring to FIG. 42, shaft 488, to which rollers 490 are keyed, connects with drive shaft 480 by arm members 493, 494. Link 495 (FIG. 43) attaches member 494 to crank 496 which is keyed to shaft 497. Rotation of shaft 497 in a clockwise direction moves roller 490 upward, to the position shown in FIG. 44. When this sequence is reversed, roller 490 is lowered against the uppermost overwraps. Since feed rolers 490 are rotating, the uppermost overwrap is fed from the stack.

As shown in FIG. 43, when the uppermost overwrap is fed by rollers 490, bent portion 540 strikes dog 541. Dog 541 is keyed to shaft 542 rotatively mounted in side plates 485, 486 of the feeder frame. Dog 541 bends the overwrap along a precreased line before the overwrap enters the bite of rollers 473, 475. As seen in FIG. 44, overwrap 545 emerges in a folded position.

Referring to FIG. 42, shaft 480 is keyed to sprocket 499, linking chain 500 with sprocket 501 (FIG. 40) which is keyed to shaft 502. On the opposite side of plate 486 (FIG. 41), shaft 502 is keyed to sprocket 503. Chain 504 links sprocket 503 with sprocket 505 via tensioning sprocket 506.

As shown in FIG. 45, sprocket 505 is integral with cam surface 510, and is rotatably mounted on shaft 480 and held thereon by clamps 511. The gear ratios between the various sprockets involved in the linkage between shaft 480 and cam surface 510 is such that for each machine cycle, cam surface 510 makes one complete revolution.

As shown in FIG. 41, raised portion 512 of cam 510 strikes pin 513 of arm 514. Arm 514 rotates shaft 497 counterclockwise against the action of spring 516. Referring to FIGS. 43 and 44, it is seen that rotation of shafts 497 moves roller 490 in a vertical direction.

At the end of a run cycle, hosiery is stripped from its folding plate at Station III. Immediately after the stripping rollers begin their travel toward the folding plate, the overwrap feeder cam lowers feed rollers 490, causing an overwrap to be fed under dog 541 and into the bite rollers 473 and 475. The overwrap stops at this point and is fed onto conveyer tray 116 during the next machine cycle. When the hosiery is stripped from its folding plate, it is ejected onto the overwrap which had been placed there a moment before.

Referring to FIG. 18, spring pushers 550 are mounted on spring brackets 551 attached to conveyor chains 153 immediately behind grippers 155, 156. The spring pushers strike the bent portion of the overwrap and push the overwrap onto the conveyer 116 toward the bagging section. After the bent portion has been folded downward by guides 553 (FIG. 18), the spring pusher releases, and the folded hosiery is stripped onto the overwrap and conveyor. On the next cycle, grippers 155 or 156 move the hosiery and overwrap into the bag in the usual manner.

Referring to FIG. 23, link 555 is attached to eccentric 240 which is in continuous rotation. Link 556 oscillates in a generally horizontal direction. Overwrap lift 558 works in the same manner as does the bag lift of FIG. 23. Arm 560 throws switch 561 when the height of the uppermost overwrap has fallen below a certain point. Switch 561 energizes solenoid 562, pulling armature 563 to the position shown in FIG. 40. As was explained in connection with the bag lift of FIG. 23, rack 565 is raised until solenoid 562 is de-energized by switch 56.

(7) Cycle shaft and programmer

A portion of cycle shaft 203 may be seen in FIG. 23. Packaging motor 570 (partially shown) drives chain 139 through gear box 571. As was previously explained in connection with FIG. 16, chain 139 connects to the input side of a clutch, the output side of which is keyed to shaft 142. Sprocket 140, keyed to shafe 142, is connected to motor 570 from the beginning of each run cycle to the end of the machine cycle. Chain 141 links sprocket 140 with sprocket 573 via tensioning sprocket 574. Sprocket 573 is keyed to shaft 575 which connects to cycle shaft 203 through gear box 577. Accordingly, cycle shaft 203 is under rotation beginning with the start of a run cycle and ending with the end of a machine cycle. Gear ratio between the various sprockets and gears between transmission 571 and gear box 577 are chosen so that cycle shaft 203 rotates one complete turn during a machine cycle.

As explained in connection with FIGS. 21 and 22, cycle shaft 203 operates link 207 via a cammed surface (not shown) to actuate the bag opening finger shafts 224. In the same manner, a cam surface on cycle shaft 203 actuates rod 110 to move the upper and lower strip rollers toward the folding plate at Station III. Rod 110 is actuated by a cam surface keyed to cycle shaft 203, which pivots arm 581 in the same manner as the cam unit for the bag opening fingers. Accordingly, the structure will not be recited in detail.

Cycle shaft 203 is supported by main bearings 583, one of which is shown in FIG. 23. It should be understood that only a portion of the cycle shaft structure is shown, certain duplicated structures to be discussed below being left out of the figure.

Sprocket 585, keyed to cycle shaft 203 links chain 586. Sprocket 587 is rotatively mounted at one end of arm 589, the other end being pivotally mounted on cycle shaft 203. Chain 586 links sprocket 585 with sprocket 587. Accordingly, sprocket 587 is in rotation whenever cycle shaft 203 is rotating. Sprocket 590 is keyed to the shaft holding sprocket 587 and links sprocket 125 (FIG. 19) with the chain 592. Spring 595 is connected to machine frame 596 and arm 589 between cycle shaft 203 and sprocket 587. Accordingly, arm 589 is spring urged to pivot pulley 590 downward. When rod 110 moves the lower strip rollers upward, sprocket 125 (FIG. 19) rises with the stripping rollers while pivoting arm 589 about cycle shaft 203.

Also connected to cycle shaft 203, but not shown, are cam units for operating the sealing iron (FIG. 28) and the bag stop and bag retaining plates (FIG. 33). These cam units work in the same manner as units 206 and 580. The timing for all cammed surfaces on cycle shaft 203 is shown in the timing diagram, FIG. 48.

In addition, cycle shaft 203 operates four cam operated switches for sequencing or programming the packaging section. The timing of the programmer switches will also be explained in connection with the explanation of FIG. 48.

(8) Electrical power and control circuitry

FIG. 46 is a schemtaic diagram of the electrical power and control circuitry of folding machine circuit 598 and packaging machine circuit 599. Power is delivered to the circuits by lines 600, 601. Actuation of power switch 602 connects line voltage to folding machine motor 603 and packaging machine motor 604 through usual fuse and breaker circuits 610, 611, respectively. The folding and packaging portions of the circuit are connected by a six conductor cable, connecting terminal blocks 606 and 607. That is, terminal 1 of terminal block 606 is connected to terminal 1 of terminal block 607, and so on.

As explained in this specification, when the machine operator desires to initiate a machine cycle, cycle switch 605 is tripped. This connects line voltage through terminals 3 and 6 of the terminal block to Solenoid Air Valve 1 (SAV 1) and Solenoid Air Valve 3 (SAV 3). The function and operation of Solenoid Air Valves 1 and 3 will be explained in detail in connection with the discussion of FIG. 47, the peneumatic circuit.

Energization of Solenoid Air Valve 1 introduces air into cylinder 10 (FIG. 8) to cause the closing of folding and insert fingers against the folding plate at Station I. As explained in connection with that figure, travel of the piston of air cylinder 10 actuates switch 18, closing contacts 615. The function of contacts 615 is to place line voltage across normally closed contacts IR–6 to Solenoid Air Valves 1 and 3. This allows the cycle switch to be released immediately, freeing the operator's hands for the next machine cycle. Accordingly, Solenoid Air Valves 1 and 3 remain energized until contacts 617 close, energizing relay and IR opening contacts IR–1 and IR–6. When the air cylinder closing the insert and folding fingers reaches the end of its travel, it strikes switch 19 (FIG. 8). This causes contacts 617 to close momentarily. Line voltage is thereby connected across relay IR. Relay contact IR–1 opens, de-energizing Solenoid Air Valves 1 and 3. Line voltage is also applied to Solenoid Air Valve 2. As will be seen in connection with the discussion of the pneumatic circuit, Solenoid Air Valve 2 operates the insert feeder.

Contacts 620, normally open, are closed by cam driven switch 523 (FIG. 9) at the beginning and end of each run cycle. During the times when contacts 620 and contacts IR–2 are closed, Solenoid Air Valve 4 is energized, which turns on the jet of air at Station II to tighten the stocking fold.

When relay IR is energized, contacts IR–2 are closed. As soon as contacts 615 and 617 are opened, contacts 622 are closed by cam operated switch 522 (FIG. 9). This keeps relay IR energized until the end of the run cycle. When contacts 622 are subsequently opened by cam driven switch 522 (FIG. 9), relay IR is de-energized and the folding plates are brought to a stop.

Energization of relay IR closes contacts IR–4, activating clutch 625. At the same time, contacts IR–5 are opened, releasing brake solenoid 627. The clutch and brake assembly is located in the drive line between folding machine motor 603 and folding plate drive shaft 25

(FIG. 9). Accordingly, as long as relay IR holds relay contacts IR–4 closed, the folding plates will be in motion. Full wave rectifier 630 provides the DC power necessary to operate the standard clutch and brake solenoid 625, 627. Capacitors 631, 632 shunt relay contacts IR–4 and IR–5 to suppress point arcing when the relays are opened. Rheostats 635, 636 adjust the amounts of current passing through the clutch and brake solenoids, thereby establishing the amount of operating torque. The electrical clutch and brake assemblies are standard equipment and are readily available.

As will be explained in connection with the packaging portion of the electrical circuit 599, power is also delivered to the packaging circuit via normally open relay contacts IR–3. As has been explained, relay IR is energized for a length of time determining the duration of the run cycle of this machine. Accordingly, line voltage is applied to terminal 4 of terminal block 607 during the entire run cycle.

In the explanation of the operation of folding portion 598 of the electrical circuit, reference was made to the application of line voltage to Solenoid Air Valve 1 through cycle switch 605 and terminals 3, 6 of terminals block 606. The connection between terminals 3 and 6 is made in packaging portion 599 of the circuit through normally closed relay contacts 2R–1 and switch contacts 610. Contacts 610 are operated by a cam operated switch mounted on the programmer which is driven by sprockets and chain from the cycle shaft at a 1:1 ratio. Switch 610 is normally closed, and functions as an interlock. The function of the switch is to prevent a further cycle of the folding machine if the packaging machine fails to complete its function due to a bag not opening at the bagging section. This result occurs since the cycle shaft and programmer shaft rotation is caused by energization of relay 2R. As will be explained below, relay 3R is energized if the bag opening fingers fail to open the uppermost bag in the bag magazine. If this condition does occur, relay contacts 3R–1 are opened, and the cycle shaft rotation is stopped. Switch contacts 610 are thereafter held open so that the folding machine can not be cycled until the condition is corrected and relay 3R is de-energized.

As was noted during the discussion of folding portion 598 of the electrical circuit, terminal 4 of terminal block 607 is at the level of line voltage during a run cycle. As soon as the run cycle begins, relay 2R is energized. Relay contacts 2R–1 open, which disconnects cycle switch 605 from the remainder of the circuit. Therefore, relay contacts 2R–1 act as an interlock preventing actuation of a second machine cycle until the present cycle is ended and relay 2R is de-energized. Similarly, manual recycling switch 640 may be actuated to begin cycles of the packaging machine only.

When energized, relay 2R closes relay 2R–3 to operate motor clutch solenoid 641. This operates clutch 143 (FIG. 16) and begins the conveyer and cycle shaft functions. As in the folding portion of the circuit, clutch solenoid 641 is supplied from full wave rectifier 645 and torque limiting rheostat 647. Also, arc suppressing capacitor 648 shunts relay contacts 2R–3.

Switch contacts 650 are operated by a cam driven switch located on programmer. Contacts 650 are initially open, closing at the beginning of the run cycle, and open at the end of the machine cycle. Relay 2R is initially energized through terminal 4 of terminal block 607. However, due to relay contacts IR–3 on the folding side of the circuit, terminal 4 is at line voltage only during the run cycle. Accordingly, after the run cycle has ended, relay 2R is energized through switch 650 and normally open relay contacts 2R–2. Therefore, cam driven contacts 650 determine the ending of the machine cycle.

As explained in the discussion of the operation of the bagging section, each bag opening finger operates a pair of contacts 650, 651. If the bag opening fingers operate properly, the bag wall is interposed between the contact points of contacts 650, 651 leaving relay 3R de-energized. If, however, a bag opening finger failed to catch one or both sides of a bag, relay 3R is energized through transformer 655. Relay contact 3R–1 are opened, de-energizing relay 2R which stops all movement in the packaging section of the machine. However, it will be remembered that after the insert and folded stocking is placed in the bag at the bagging section, the entire package is pushed toward the sealing station by the conveyer. As soon as the bag leaves the bag opening fingers, contacts 650, 651 are closed, energizing relay 3R. Since this is a normal operation, relay 2R should remain energized in these cases. Switch contacts 658 are provided for this purpose. Contacts 658 are operated by a cam driven switch located on the programmer. The function of contacts 658 is to maintain relay 2R in an on condition after the package leaves the bagging section.

Solenoid Air Valve 5 operates the air jet that opens the bag at the bagging section, as was explained in connection with FIG. 18. As soon as relay 2R is energized, Solenoid Air Valve 5 is energized through normally closed push button switch 660 and photocell circuit 661 and LS–1 (Pack. Mach.). Photocell circuit 661 is located at Station III adjacent the stripping rollers. If the machine fails to strip the folded hosiery from the folding plate Station III, photo cell circuit 661 would open, preventing solenoid air valve from operating the air jet. This insures that no bag is fed toward the heat seal station where it would become stuck if it were empty. Push button 660 may be manually operated to connect line voltage across Solenoid Air Valve 5 to manually recycle the bag opening portion of the packaging sequence. Light source 670 is connected across line voltage at all times to operate photocell circuit 661.

Solenoid 673 is connected across line voltage through switch contacts 671, 672. Solenoid 673 operates the bag lift device described in connection with FIG. 23. That is, energization of solenoid 673 causes rack plate 192 (FIG. 23) to rise. Switch contacts 672 are operated by arm 227 of switch assembly 226 (FIG. 18). Contacts 672 are normally open and are closed by switch assembly 226 whenever the level of the bags in the bag hopper is to be raised. Normally closed switch contacts 671 are operated by switch 291 (FIG. 18) when the bag rack is lowered for removal of the bag hopper. This assures that the bag lift mechanism will not be in operation when the bag hopper is out of the machine.

Similarly, overwrap lift solenoid 675 is connected across line voltage by normally open switch contacts 676. Switch contacts 676 are operated by switch assembly 561 (FIG. 40). Like the operation of the bag lift mechanism, switch contacts 676 closed to operate the overwrap lift solenoid whenever the overwrap supply falls below a certain point.

Sealing iron 578 is connected across line voltage through temperature control device 680. When the machine is initially turned on, the operator must adjust temperature control 680 to the desired temperaure. When sealing iron 678 reaches this temperature, pilot light 682 turns on, indicating that the operator may begin the first machine cycle.

(9) Pneumatic circuit

As has been explained in this specification, actuation of many of the functions of this invention is accomplished by pneumatic cylinders. The pneumatic circuit for folding portion 690 and packaging portion 691 is shown in FIG. 47 of the drawings. A source of pneumatic pressure is connected into the pneumatic circuit via line 693 through filter 694 and constant pressure regulator 695. In addition, lubricator 697 is inserted into folding machine portion 690 of the circuit to maintain sufficient lubrication of the moving parts of the solenoid air valves and air cylinders.

As was explained in connection with the discussion of FIG. 34, air cylinder 373 maintains a constant pressure on the supply of cardboard inserts in the standard insert feeder. Cylinder 373 is supplied through input line 698 and manual air valve 699. Pressure regulator 700 adjusts the pressure exerted on the insert supply in the insert feeder. In the normal operation of the machine, valve 699 is in the position shown in FIG. 47 until the insert feeder becomes empty. In order to reload the insert feeder, the rod of cylinder 373 must be retracted. To accomplish this, valve 699 is manually actuated which allows cylinder 373 to exhaust through open port 701 in valve 699. After the new supply of inserts are placed in the insert feeder, valve 699 is returned to the position shown in the figure and cylinder 373 maintains constant pressure on the insert supply.

Solenoid Air Valve 4 is normally closed and is fed by line 703. As was explained, a jet of air is directed at the folded hose at Station II from nozzle 22 (FIG. 8) at the beginning and end of each run cycle. As explained in connection with FIG. 46, switch contacts 620 operate Solenoid Air Valve 4 at the beginning and end of each run cycle. When Solenoid Air Valve 4 is energized by contact 620 input, line 703 is connected to nozzle line 705 through the normally closed valve. This produces the jet of air exiting from nozzle 22 to tighten the fold at Station II of the folding machine.

Similarly, Solenoid Air Valve 5 (FIG. 46), controls the jet of air which is emitted by nozzle 201 (FIG. 18) to open the uppermost bag at the bagging section prior to the insertion of the folded hose. As was explained in connection with FIG. 46, energization of Solenoid Air Valve 5 causes the air jet to be actuated at the bagging section. Solenoid Air Valve 5 is fed from line 707. Energization of Solenoid Air Valve 5 connects line 707 to nozzle line 708. This produces the jet of air which opens the bag at the bagging section.

As was explained in connection with FIG. 21, air cylinder 230 may be manually operated to initiate the bag opening sequence manually. Solenoid Air Valve 6 is fed from line 710. Cylinder 230 is normally spring urged to a closed position and exhausts through open port 711. Manual actuation of Solenoid Air Valve 6 connects line 710 to cylinder line 712 and causes the bag opening fingers to operate.

Solenoid Air Valves 1, 2 and 3 operate finger actuator cylinder 10 (FIG. 8), standard insert feeder cylinder 411 (FIG. 37) and roller pressure cylinder 385 (FIG. 34). As explained in connection with the electrical circuit (FIG. 46) operation of the cycle switch by the operator initially energizes Solenoid Air Valves 1 and 3. Shortly thereafter, Solenoid Air Valve 2 is energized, Solenoid Air Valves 1 and 3 being deenergized at the same time. Accordingly, there are three conditions which occur in the portion of the pneumatic circuit involving Solenoid Air Valves 1, 2 and 3.

The first condition occurs with the initial actuation of the cycle switch by the operator. Solenoid Air Valves 1 and 3 are energized, Solenoid Air Valve 2 remaining deenergized. Line 712 is connected to normally closed Solenoid Air Valve 1. Prior to actuation of the cycle switch, the left side of finger actuator cylinder 10 is connected via line 713 and construction 714 shunting one-way valve 715 to the atmosphere via open port 717 in Solenoid Air Valve 1. Accordingly, prior to the energization of Solenoid Air Valve 1, the rod of finger actuator cylinder 10 is to the left in FIG. 47. When Solenoid Air Valve 1 is energized, line 712 is connected through the valve and one-way valve 715 to finger actuator cylinder 10, driving the cylinder rod to the right in the figure. The cylinder exhausts through line 720 and open port 721 of Solenoid Air Valve 2. At the same time, Solenoid Air Valve 3 is energized, exhausting roller pressure cylinder 385 through one-way valve 722, line 723 and open port 724 of Solenoid Air Valve 3. At the same time, the right hand side of roller pressure cylinder 385 is connected to pressure line 712 through Solenoid Air Valve 1, shuttle valve 725, and line 727. This moves the cylinder rod to the left in FIG. 47, swinging lower roller 383 away from lower feed roller 381 (FIG. 35).

The second condition in the pneumatic circuit occurs when Solenoid Air Valves 1 and 3 are de-energized and Solenoid Air Valve 2 is energized. As was discussed in connection with the electrical circuit (FIG. 46), this occurs at the time of the energization of relay IR in the folding section 598 of the circuit. Under this condition, line 730 is connected via port 731 to line 720 and the right hand side of finger actuator cylinder 10. This causes the cylinder to retract slowly, exhausting through restriction 714 and open port 717 of Solenoid Air Valve 1. At the same time, line 735 is connected through one-way valve 736 to the left side of insert feed cylinder 411. The feed cylinder exhausts through restriction 740 and open port 742 of Solenoid Air Valve 2. Accordingly, the insert feed cylinder rod advances to the right in FIG. 47, operating the upper feed roller in the normal insert feeder (FIG. 34). At the same time, line 735 is connected to the right side of cylinder 385 via shuttle valve 725 and line 727. Since line 727 is thus at the pressure of the input air supply and the left side of cylinder 385 is connected to the same supply via pressure lowering regulator 750, the rod of roller pressure cylinder 385 is maintained to the left in FIG. 47, which holds the lower feed rollers apart, allowing an insert to be fed therebetween.

The third condition occurs at the end of the run cycle when Solenoid Air Valves 1, 2 and 3 are all de-energized. Roller pressure cylinder 385 is connected to line 723 through one-way valve 722. The right side of cylinder 385 exhausts through shuttle valve 725, line 735 and open port 721 of Solenoid Air Valve 2. Accordingly, the cylinder rod of roller pressure cylinder 385 is extended. Referring to FIG. 34, this pivots roller 383 against lower feed roller 381 of the standard insert feeder. At the same time, the right side of insert feed cylinder 411 is connected to line 730 through line 755 via Solenoid Air Valve 2, line 755 and one-way valve 740. This causes the rod of insert feed cylinder 411 to travel to the left in FIG. 47. The cylinder exhausts through constriction 757 and port 721 of Solenoid Air Valve 2. This causes an insert to be fed between the opened insert fingers at Station 4 of the folding machine after the end of a run cycle.

(10) Timing diagram

FIG. 48 is a timing diagram which illustrates the time relationships of the operation of various switches, pneumatic cylinders and cam operated devices in this invention. As was explained at the outset, the timing is described in relation to two cycles. The first, termed a machine cycle, begins with the activation of the cycle switch by the operator and ends when the last operation is completed. The second, termed a run cycle, begins with the beginning of folding plate travel and ends when the folding plates come to a complete stop. It will be recalled that not all cam surfaces operating on the cycle shaft were disclosed in the drawings. Rather, since the structure of each is substantially the same, only a representative cam structure was disclosed. The only differences between the cam operated devices lies in the configuration of the cam itself. The rise portion of the cam is each instance may be determined by an examination of the timing chart of FIG. 48. Additionally, certain sequencing operations in the folding machine are carried out by two switches (522, 523 in FIG. 9) located on the idle shaft of the folding machine. No detailed description of these cam operated switches was given as such devices are well known in the art. The rise portions of each cam switch may also be determined from an examination of the timing chart. Further, as was explained in connection with the description of the packaging machine, a number of sequencing operations in the packaging section of this invention are carried out by certain cam operated programmer switches. The rise time of these cams may also be obtained from an examination of FIG. 48.

Referring now to FIG. 48, duration 775 of the cycle switch is seen to be quite short. It is only necessary that the cycle switch be momentarily closed by the operator. The cycle switch was disclosed in connection with the description of FIG. 1 as being located on the table top. As may be readily appreciated, the cycle switch may also be foot operated.

Duration 776 is the period of time that switch 19 (FIG. 8) is closed by the activation of finger actuator cylinder 10. Contacts 617 (FIG. 46) are maintained closed for a duration of time only necessary to energize relay IR. Thereafter, relay IR remains energized through relay contacts IR–2 and switch contacts 615, duration 777 in FIG. 48.

Switch 523 is cam operated by a cam surface located on the idle shaft of the folding machine and closes contacts 620 for duration 779. Switch 523 closes contact 620 at the beginning and end of a run cycle to activate Solenoid Air Valve 4 causing the air jet at Station II.

Solenoid Air Valve I is energized for duration 780 from the initial closing of the cycle switch to the beginning of the run cycle. Solenoid Air Valve I is energized by the cycle switch or is caused to be energized by the cycle switch and is deenergized by the energization of relay IR. Solenoid Air Valve 2 is energized for duration 781 during an entire run cycle. Solenoid Air Valve 2 controls the actuation of the finger actuator cylinder, insert feed cylinder and roller pressure cylinder.

Solenoid Air Valve 3 is activated for duration 782 from the initial activation of the cycle switch to the beginning of the first run of the run cycle. Like Solenoid Air Valve 1, it is de-energized by the energization of relay IR. Solenoid Air Valve 3 controls the pressuring and discharge of roller pressure cylinder 385 (FIG. 47).

Solenoid Air Valve 4, energized for duration 783 is turned on by the energization of relay IR and switch contacts 620. Accordingly, Solenoid Air Valve 4 is energized at the beginning and end of the run cycle. The air jet at Station II for tightening the hosiery fold is controlled by Solenoid Air Valve 4.

Solenoid Air Valve 5 is energized for duration 784 during the initial part of a run cycle. The bag opening jet (nozzle 201, FIG. 18) is controlled by Solenoid Air Valve 5. Since the conveyor which moves the stripped hosiery fold toward the bagging section begins its movement at the start of the run cycle, Solenoid Air Valve 5 turns on nozzle 201 to hold the bag mouth open until the bag fingers 196, 197 have entered the opened bag.

Relay IR is energized for duration 785 during the run cycle. It is energization of relay IR that determines the duration of the run cycle since relay contacts operated by relay IR activate clutch solenoids 625 (FIG. 46) of the folding machine motor. Energization of relay IR is initially started by contacts 617 of switch 19 and is ended by contacts 622 of switch 522.

Relay 2R of the packaging section is energized for duration 786 and controls the various functions of the packaging section of the invention. Energization of relay IR energizes relay 2R through relay contacts IR–3 (FIG. 46). Duration 786 is ended by the opening of contacts 650 by one of the cam operated programmer switches operated by the cycle shaft.

Folding plate travel, duration 787, defines the extent of the run cycle. Since the folding plate travel is determined by the period of time the folding plate motor clutch (625, FIG. 46) is activated, the folding plate travel duration is identical to the duration of energization of relay IR.

As explained in connection with the discussion of FIG. 47, insert feed cylinder 411 drives the upper feed rolls during the initial part of the run cycle. The length of duration 788 is determined in the main by the size of the constriction through which the insert feed cylinder exhausts.

Solenoid Air Valve 2 is de-energized at the end of the run cycle. This causes insert feed cylinder 411 (FIG. 47) to retract for duration 789. This duration is also determined mainly by the size of constriction (757, FIG. 47) through which the insert feed cylinder discharges.

The conveyor for moving the hosiery fold into the package section in the package conveyor runs for a period of time determined by the energization of relay 2R. This extends for durations 790 from the beginning of the run cycle to the end of the machine cycle.

The air jet at the bagging section opens the uppermost bag during the initial part of the run cycle. It is noted that the bag fingers start closing slightly before the air jet from Solenoid Air Valve 5. The flap weight holds the bags in place while the uppermost bag is inflated by the air jet.

The flap folder closes the bag flap against the upper side of the bag at the sealing station during the run cycle and is cam operated during duration 792. The duration of the flap folder function is not critical but must be closed on the flap when heat sealing iron makes contact with bag (see timing diagram 796).

Bag stop and bag drop durations 793, 794 are determined by the same cam arrangement. When the bag stop is closed, stopping the bag from traveling further on the packaging conveyor, the bag drop retaining plates are open and vice versa. As explained in connection with FIG. 33, when the bag stop opens, the bag drop retaining plates close so that the bag when dropped will be dropped in a flat position.

Strip rolls at Station III are closed for duration 795 after the end of the run cycle. The cam surface on the cycle shaft may begin closing the upper and lower strip rollers as the folding plate approaches position of station III in a horizontal position.

The heat seal at the sealing station is in contact for duration 796. As explained in connection with the discussion of FIG. 32, this time is somewhat critical as an overly extended contact period would damage the packaged hosiery. Actual contact time and temperature has been given elsewhere in this specification.

Contacts 658 are closed for duration 798 by a cam driven switch located on the programmer. The function of contact 658 is to maintain relay 2R in an on condition after the package leaves the bagging section.

Contacts 610 are closed for duration 799 by a cam driven switch located on the programmer. Switch 16 serves as an interlock and prevents a further cycle of the folding machine if the packaging machine fails to complete its function due to a bag not opening at the bagging section.

Contacts 650 are closed for duration 800 by a cam driven switch also located on the programmer and determine the ending of the machine cycle.

In those folds in which an overwrap is utilized, cam 510 (FIG. 41) causes the overwrap feeding wheel to be lowered and feed an overwrap for duration 801. The overwrap is thereby in position to receive the next stripped hosiery.

As is readily apparent from the above specification and appended drawings, this invention is capable of folding and packaging virtually any number of pairs of hosiery. Moreover, unlike any machine of a prior art, virtually any type fold may be accomplished using any one of a variety of insert positions and overwraps.

As will readily be appreciated by those skilled in the art, changes may be made in the structure of the invention disclosed herein without departing from the spirit of this invention. Applicants recognize that certain structures of this invention may be deleted, the deletion working only to lessen the efficiency. For example, the embodiment described in this specification includes folding plates around which the hosiery is convolutely wound. It is readily seen that for any fold in which the hosiery is positioned against an insert prior to the beginning of the wind, the plate is not necessary. Referring to FIGS. 4 and 6, it is seen that the hosiery rests against a cardboard insert and may be wound thereabout without reliance on the folding plate.

We claim:

1. In a machine for folding flexible sheet material, a folding mechanism comprising plate means supported for rotation about an axis lying substantially in the plane of the plate means, retaining means associated with said plate means for holding sheet material placed against the surface of the plate means at an input station, and means for moving said plate means away from said input station and rotating said plate means to form the sheet material in a flat convolute fold thereabout.

2. The machine of claim 1, further comprising initiating means for operating said retaining means to hold said sheet material and to control the beginning of movement of said plate means away from said input station and the beginning of rotation of said plate means.

3. The machine of claim 1, further comprising stripping means for removing the folded sheet material from said plate means in the direction of said axis after said convolute fold is formed.

4. The machine of claim 1, wherein said plate means is supported only at one end for rotation about said axis.

5. The machine of claim 1, further comprising insert sequence means operable to control the time of placement of an insert against said plate means at said input station, and insert means associated with said retaining means for placing an insert against said plate means at said input station at a time determined by said sequence means.

6. The machine of claim 5, wherein said insert means comprises sets of finger pairs movable about an axis perpendicular to the axis of rotation of said plate means.

7. The machine of claim 1, wherein said retaining means is movable about a second axis perpendicular to the axis of rotation of said plate means.

8. The machine of claim 7, wherein said plate means is supported only at one end for rotation about said axis, said retaining means comprises first and second sets of fingers, and said second axis is adjacent the supported end of said plate means.

9. In a machine for folding flexible sheet material having a folding mechanism comprising plate means supported for rotation about an axis lying substantially in the plane of the plate means wherein rotation of said plate means convolutely winds thereabout sheet material placed against said plate means at an input station, the improvement comprising moving said plate means and its axis of rotation away from said input station after said sheet material is placed against said plate means.

10. In a machine for folding flexible sheet material, a folding mechanism comprising plate means supported for rotation about an axis lying substantially in the plane of the plate means, means for rotating said plate means to convolutely wind thereabout flexible sheet material placed against said plate means at an input station, and means for moving said plate means and its axis of rotation away from said input station.

11. The machine of claim 10, wherein said plate means is supported only at one end for rotation about said axis.

12. The machine of claim 10, further comprising insert sequence means operable to control the time of placement of an insert against said plate means at said input station, and insert means associated with said plate means for placing an insert against said plate means at said input station at a time determined by said sequence means.

13. The machine of claim 12, wherein said insert means is movable about an axis perpendicular to the axis of rotation of said plate means.

14. The machine of claim 12, wherein said insert means comprises finger pairs movable about an axis perpendicular to the axis of rotation of said plate means.

15. The machine of claim 10, further comprising stripping means for removing the sheet material from said plate means in the direction of said axis after said material is convolutely wound about said plate means.

16. The machine of claim 15, wherein said stripping means comprises first and second roller sets operative to close upon said plate means and rotate, stripping the convolutely folded material therefrom.

17. In a machine for folding flexible sheet material, a folding mechanism comprising plate means supported for rotation through more than 360° about an axis lying substantially in the plane of the plate means, wherein rotation of said plate means convolutely winds thereabout sheet material placed against said plate means, and first and second retaining means associated with said plate means for holding sheet material placed against said plate means at an input station.

18. The machine of claim 17, wherein said plate means is supported only at one end for rotation about said axis.

19. The machine of claim 17, wherein said plate means is supported only at one end for rotation about said axis, said first and second retaining means comprise first and second sets of fingers, respectively movable about axes on opposite sides of said plate means, said axes being perpendicular to the axis of rotation of said plate means and located adjacent to the supported end of said plate means.

20. The machine of claim 17, wherein said first and second retaining means are movable about axes perpendicular to the axis of rotation of said place means.

21. The machine of claim 20, wherein said first and second retaining means comprise first and second sets of fingers, respectively, each set mounted on opposite sides of said plate means.

22. The machine of claim 17, further comprising insert sequence means operable to control the time of placement of an insert against said plate means at said input station, and insert means associated with each of said retaining means for placing an insert against said plate means at said input station at a time determined by said sequence means.

23. The machine of claim 22, wherein said insert means comprises first and second sets of finger pairs movable about the same axes perpendicular to said axis of rotation of said plate means.

24. The machine of claim 17, further comprising stripping means operative to strip said sheet material from said plate means after said material is convolutely wound thereabout.

25. In a machine for folding flexible sheet material, a plurality of folding mechanisms each comprising
plate means supported for rotation about an axis lying substantially in the plane of each plate means,
retaining means associated with each plate means for holding sheet material placed against the surface of the plate means at an input station,
means connecting said plate means for moving successive ones of said plate means to and from said input station during successive cycles,
means for rotating said plate means after said material is placed thereagainst to form said material in a flat convolute fold thereabout.

26. The machine of claim 25, wherein
each of said plate means is supported only at one end for rotation about its axis.

27. The machine of claim 25, further comprising
initiating means operable at the beginning of each of said cycles for operating said retaining means and for beginning rotation of said plate means and movement of said plate means away from said input station.

28. The machine of claim 25, wherein
said retaining means comprises first and second holding means associated with said plate means on opposite sides thereof, and
further comprising initiating means operable at the beginning of each of said cycles for operating said first holding means to hold said sheet material and for controlling the beginning of movement of said plate means away from said input station and the beginning of rotation of said plate means.

29. The machine of claim 28,
wherein said first and second holding means are movable about axes perpendicular to the axis of rotation of said plate means.

30. The machine of claim 25, further comprising
stripping means operative to remove the folded material from said plate means in the direction of said axis after said convolute fold is formed.

31. The machine of claim 25, further comprising
insert sequence means operable to control the time of placement of an insert against said plate means at said input station, and
insert means associated with said retaining means for placing an insert against said plate means at said input station at a time determined by said sequence means.

32. The machine of claim 31, wherein
said insert means comprises sets of finger pairs movable about axes perpendicular to said axis of rotation.

33. The machine of claim 31, further comprising
insert feeding means operable to feed an insert into said insert means at a time prior to the arrival of the insert means and its associated plate means at said input station.

34. A machine according to claim 25 wherein the retaining means is at least one finger supported for movement toward the plate means to grip the sheet material between the finger and the plate means.

35. A machine according to claim 25 having an insert holder movable with each plate means, and means for feeding inserts into the insert holder prior to the arrival of the plate means at the input station.

36. A machine according to claim 35 wherein the insert holder is pivotally movable from a raised position spaced from the plate means to a lowered position where an insert therein is parallel and adjacent to the plate means, said insert holder being maintained in its raised position when at said feeding means, and selectively operable means for moving the insert holder from its raised position to its lowered position prior to the arrival of its respective plate means at the input station.

37. In a machine for folding flexible sheet material,
means mounted for rotation about a rotational axis for supporting flexible sheet material placed thereagainst at an input station,
retaining means associated with said supporting means for holding said sheet material after it is placed against said supporting means, and
at least one means for moving said supporting means and its rotational axis away from said input station and rotating said supporting means to form the sheet material in a flat convolute fold thereabout.

38. The machine of claim 37, further comprising
initiating means for operating said retaining means to hold said sheet material and to control the beginning of movement of said supporting means away from said input station and the beginning of rotation of said supporting means.

39. The machine of claim 37, further comprising
stripping means for removing the folded sheet material from said supporting means in the direction of the axis of rotation of said supporting means after said convolute fold is formed.

40. The machine of claim 37,
wherein said supporting means comprises a plate means.

41. The machine of claim 37,
wherein said supporting means comprises sets of opposing finger pairs for holding an insert, and
an insert positioned between said finger pairs.

42. In a machine for folding flexible sheet material,
means rotatively mounted for supporting flexible sheet material placed thereagainst at an input station,
means for rotating said supporting means about its axis of rotation to convolutely wind thereabout sheet material placed thereagainst, and
means for moving said supporting means and its axis of rotation away from said input station.

43. The machine of claim 42, further comprising
stripping means for removing the sheet material from said supporting means in the direction of the axis of rotation of said supporting means after said material is convolutely wound thereabout.

44. The machine of claim 42,
wherein said supporting means comprises a plate means.

45. A machine according to claim 42 wherein the means for rotating the supporting means and the means for moving the supporting means operate simultaneously.

46. A machine according to claim 45 wherein the means for rotating the supporting means is a stationary member operatively connected to the supporting means to rotate the supporting means during relative movement between the supporting means and the stationary member.

47. A machine according to claim 45 having retaining means for holding sheet material on the supporting means, said retaining means including a finger which is pivotally movable between retracted and operative positions, resilient means which operates through an over-center position to bias the finger either to its retracted position or to its operative position, and means for moving the finger with respect to the resilient means and across the over-center position.

48. A machine according to claim 42 having first retaining means for holding a leading end of the sheet material and second retaining means for holding a trailing end of the sheet material, means for actuating the first retaining means prior to rotation of the supporting means, and means for actuating the second retaining means after the sheet material is folded.

49. A machine according to claim 48 having means for directing a jet of fluid against the article to maintain it in a taut folded condition prior to the actuation of the second retaining means.

(References on following page)

References Cited

UNITED STATES PATENTS

| | | | |
|---|---|---|---|
| 2,629,521 | 2/1953 | Johnson et al. | 233—37 |
| 2,954,906 | 10/1960 | Lamade et al. | 223—1 |
| 3,290,855 | 12/1966 | Brinck et al. | 53—117 X |
| 3,310,930 | 3/1967 | Korch et al | 53—117 |
| 3,391,839 | 9/1968 | Gwinn et al. | 223—37 |

MERVIN STEIN, Primary Examiner

G. V. LARKIN, Assistant Examiner

U.S. Cl. X.R.

53—21, 117; 223—37